(12) United States Patent
Lui et al.

(10) Patent No.: US 6,396,505 B1
(45) Date of Patent: May 28, 2002

(54) METHODS AND APPARATUS FOR DETECTING AND REDUCING COLOR ERRORS IN IMAGES

(75) Inventors: Charlton E. Lui, Redmond, WA (US); Leroy B. Keely, Jr., Portola Valley, CA (US); Gregory C. Hitchcock, Woodinville; Ryan E. Cukierman, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/301,943

(22) Filed: Apr. 29, 1999

Related U.S. Application Data

(63) Continuation-in-part of application No. 09/191,173, filed on Nov. 13, 1998, now Pat. No. 6,243,070, and a continuation-in-part of application No. 09/168,013, filed on Oct. 7, 1998, now Pat. No. 6,278,434.

(51) Int. Cl.$^7$ .............................................. G06T 11/40

(52) U.S. Cl. ........................................ 345/613; 345/589

(58) Field of Search ................................. 345/152, 136, 345/137, 426, 611, 613, 614, 589; 348/790, 627, 674, 607; 382/266

(56) References Cited

U.S. PATENT DOCUMENTS

| | | | |
|---|---|---|---|
| 4,136,359 A | 1/1979 | Wozniak | 358/17 |
| 4,217,604 A | 8/1980 | Wozniak | 358/16 |
| 4,278,972 A | 7/1981 | Wozniak | 340/703 |
| 4,368,485 A | * 1/1983 | Midland | 358/64 |
| 4,703,318 A | 10/1987 | Haggerty | 346/723 |
| 4,716,403 A | * 12/1987 | Morozumi | 340/702 |
| 4,720,705 A | * 1/1988 | Gupta et al. | 345/20 |
| 4,851,825 A | 7/1989 | Naiman | 340/728 |
| 5,113,455 A | 5/1992 | Scott | 382/47 |
| 5,153,577 A | 10/1992 | Mackey et al. | 340/793 |
| 5,254,982 A | 10/1993 | Feigenblatt et al. | 345/148 |

(List continued on next page.)

OTHER PUBLICATIONS

Abram, G. et al. "Efficient Alias–free Rendering using Bit–masks and Look–Up Tables" *San Francisco*, vol. 19, No. 3, 1985 (pp. 53–59).

(List continued on next page.)

*Primary Examiner*—Jeffery Brier
*Assistant Examiner*—Ryan Yang
(74) *Attorney, Agent, or Firm*—Workman, Nydegger, Seeley

(57) ABSTRACT

Display apparatus, and methods for displaying images, e.g., text, on gray scale and color monitors where each pixel includes multiple pixel sub-components are described. Filtering and/or displaced sampling is used to generate pixel sub-component luminous intensity values. As a result of treating pixel sub-components as distinct light emitters corresponding to different image portions, resolution is enhanced but color errors may be introduced into the image being displayed. Various techniques for detecting noticeable and/or distracting color errors are described. In addition, various techniques for correcting, compensating for, or reducing color errors are described. In one particular embodiment, red, green and blue pixel sub-component luminous intensity values are examined and compared to a range of luminous intensity values which is determined as a function of utilized foreground and background pixel colors. Pixel sub-component luminous intensity values which are determined to be outside the range of acceptable values are adjusted to fall within the range of acceptable values. In one particular embodiment, individual pixel sub-component luminous intensity values outside the range of acceptable values are clamped to the nearer of the foreground or background pixel sub-component luminous intensity value of the correspondingly colored pixel sub-component. In another embodiment sequential red and blue filters are used to reduce or compensate for color distortions.

44 Claims, 21 Drawing Sheets

U.S. PATENT DOCUMENTS

| | | | | |
|---|---|---|---|---|
| 5,294,989 | A | * 3/1994 | Moore et al. | 348/241 |
| 5,334,992 | A | 8/1994 | Rochat et al. | 345/22 |
| 5,404,432 | A | 4/1995 | Koopman et al. | 395/144 |
| 5,444,460 | A | 8/1995 | Fujitaka et al. | 345/144 |
| 5,457,477 | A | * 10/1995 | Wang et al. | 345/589 |
| 5,502,490 | A | 3/1996 | Takanashi et al. | 358/296 |
| 5,515,172 | A | * 5/1996 | Shiau | 358/298 |
| 5,623,593 | A | 4/1997 | Spells, III | 395/172 |
| 5,684,510 | A | * 11/1997 | Brassell et al. | 345/443 |
| 5,757,347 | A | 5/1998 | Han | 345/88 |
| 5,940,080 | A | * 8/1999 | Ruehle et al. | 345/611 |
| 5,995,070 | A | * 11/1999 | Kitada | 345/83 |
| 6,008,868 | A | * 12/1999 | Silverbrook | 348/790 |
| 6,097,367 | A | * 8/2000 | Kuriwaki et al. | 345/150 |
| 6,100,861 | A | * 8/2000 | Cohen et al. | 345/88 |
| 6,229,521 | B1 | * 5/2001 | Yip | 345/467 |

OTHER PUBLICATIONS

Ahumada, A.J. et al. "43.1: A Simple Vision Model for Inhomogeneous Image–Quality Assessment"*1998 SID*.

Barbier, B. "25.1: Multi–Scale Filtering for Image Quality on LCD Matrix Displays" *SID 96 Digest*.

Barten, P.G.J. "P–8; Effect of Gamma on Subjective Image Quality" *SID 96 Digest*.

Beck. D.R. "Motion Dithering for Increasing Perceived Image Quality for Low–Resolution Displays" *1998 SID*.

Bedford–Roberts, J. et al. "10.4: Testing the Value of Gray-Scaling for Images of Handwriting" *SID 95 Digest*, pp. 125–128.

Chen, L.M. et al. "Visual Resolution Limits for Color Matrix Displays" *Displays–Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Design*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct 1992–Mar. 1995.

Gould, J.D. et al. "Reading From CRT Displays Can Be as Fast as Reading From Paper" *Human Factors*, vol. 29 No. 5, pp. 497–517, Oct. 1987.

Gupta, S. et al. "Anti–Aliasing Characters Displayed by Text Terminal" *IBM Technical Disclosure Bulletin* May 1983 pp. 6434–6436.

Hara, Z. et al. "Pictre Quality of Different Pixel Arrangements for Large–Sized Matrix Displays" *Electronics and Communications in Japan*, Part 2, vol. 77, No. 7, 1974, pp. 105–120.

Kato, Y. et al. "13:2 A Fourier Analysis of CRT Displays Considering the Mask Structure, Beam Spot Size, and Scan Pattern" (c) *1998 SID*.

Krantz, J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems"*1998 SID*.

Mitchel , D.P. "Generating Antialiased Images at Low Sampling Densities" *Computer Graphics*, vol. 21, No. 4, Jul. 1987, pp. 65–69.

Mitchell, D.P. et al.,"Reconstruction Filters in Computer Graphics", *Computer Graphics*;vol. 22, No. 4, Aug. 1988, pp. 221–228.

Morris R.A., et al. "Legibility of Condensed Perceptually-tuned Grayscale Fonts" *Electronic publishing, Artistic Imaging, and Digital Typography*, Seventh International Conference on Electronic Publishing, Mar. 30–Apr. 3, 1998, pp. 281–293.

Murch, G. et al. "7.1: Resolution and Addressability: How Much iis Enough?" *SID 85 Digest*, pp. 101–103.

Naiman, A., "Some New Ingredients for the Cookbook Approach to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Association of Computer Machinery* 1979, pp. 63–70.

"The Legibility of Screen Formats: Are Three Columns Better Than One?" http://fontweb/internal/repository/research/scrnformat.asp?RES=ultra, 16 pages, Jun. 3, 1998.

"Legibility on screen: A report on research into line length, document height and number of columns" http://fontweb/internal/repository/research/scrnlegi.asp?RES=ultra Jun. 3, 1998.

"Typographic Research" http://fontweb/internal/repository/research/research2.asp?RES=ultra Jun. 3, 1998.

* cited by examiner

US 6,396,505 B1

METHODS AND APPARATUS FOR DETECTING AND REDUCING COLOR ERRORS IN IMAGES

RELATED APPLICATIONS

The present application is a continuation-in-part of U.S. patent application Ser. No. 09/191,173, which was filed Nov. 13, 1998 and is now issued as U.S. Pat. No. 6,243,070, and a continuation-in-part of U.S. patent application Ser. No. 09/168,013, which was filed Oct. 7, 1998 and is now issued as U.S. Pat. No. 6,278,434, both of which are expressly incorporated by reference.

FIELD OF THE INVENTION

The present invention relates to methods and apparatus for displaying images, and more particularly, to methods and apparatus for detecting and/or compensating for color errors in images intended to be displayed using multiple displaced portions of an output device, e.g., liquid crystal display.

BACKGROUND OF THE INVENTION

Color display devices have become the principal display devices of choice for most computer users. The display of color on a monitor is normally achieved by operating the display device to emit light, e.g., a combination of red, green, and blue light, which results in one or more colors being perceived by a human viewer.

In cathode ray tube (CRT) display devices, the different colors of light are generated via the use of phosphor coatings which may be applied as dots in a sequence on the screen of the CRT. A different phosphor coating is normally used to generate each of the three colors, red, green, and blue resulting in repeating sequences of phosphor dots which, when excited by a beam of electrons will generate the colors red, green and blue.

The term pixel is commonly used to refer to one spot in, e.g., a rectangular grid of thousands of such spots. The spots are individually used by a computer to form an image on the display device.

In color displays, the intensity of the light emitted corresponding to the additive primary colors, red, green and blue, can be varied to get the appearance of almost any desired color pixel. Adding no color, i.e., emitting no light, produces a black pixel. Adding 100 percent of all three colors results in white.

FIG. 1 illustrates a known portable computer 100, which comprises a housing 101, a disk drive 105, keyboard 104 and a flat panel display 102.

Portable personal computers 100 tend to use liquid crystal displays (LCD) or other flat panel display devices 102, as opposed to CRT displays. This is because flat panel displays tend to be small and lightweight as compared to CRT displays. In addition, flat panel displays tend to consume less power than comparable sized CRT displays making them better suited for battery powered applications than CRT displays.

As the quality of flat panel color displays continues to increase and their cost decreases, flat panel displays are beginning to replace CRT displays in desktop applications. Accordingly, flat panel displays, and LCDs in particular, are becoming ever more common.

Color LCD displays are exemplary of display devices which utilize multiple distinctly addressable elements, referred to herein as pixel sub-elements or pixel sub-components, to represent each pixel of an image being displayed. Normally, each pixel on a color LCD display is represented by a set of pixel sub-components which usually comprises three non-square elements, i.e., red, green and blue (RGB) pixel sub-components. Thus, in such systems, a set of RGB pixel sub-components together make up a single pixel. In the patent applications cited in the related applications section set forth above, a set of R, G, B pixel sub-components which comprise a pixel, was sometimes referred to as a pixel element.

LCD displays, of one known type commonly used in computer systems, comprise sets of RGB pixel sub-components which are used to represent pixels. In such systems, the RGB pixel sub-components are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB stripes running in the vertical direction.

FIG. 2A illustrates a known LCD screen 200 comprising a plurality of rows (R1–R12) and columns (C1–C16) which may be used as the display 102. Each row/column intersection forms a square which represents one pixel. FIG. 2B illustrates the upper left hand portion of the known display 200 in greater detail.

Note in FIG. 2B how each pixel element, e.g., the (R2, C1) pixel element, comprises three distinct sub-elements or sub-components, a red sub-component 206, a green sub-component 207 and a blue sub-component 208. Each known pixel sub-component 206, 207, 208 is ⅓ or approximately ⅓ the width of a pixel while being equal, or approximately equal, in height to the height of a pixel. Thus, when combined, the three ⅓ width pixel sub-components 206, 207, 208 form a single pixel element.

As illustrated in FIG. 2A, one known arrangement of RGB pixel sub-components 206, 207, 208 form what appear to be vertical color stripes down the display 200. Accordingly, the arrangement of ⅓ width color sub-components 206, 207, 208, in the known manner illustrated in FIGS. 2A and 2B, is sometimes called "vertical striping".

While only 12 rows and 16 columns are shown in FIG. 2A for purposes of illustration, common column×row ratios include, e.g., 640×480, 800×600, and 1024×768.

LCDs are manufactured with pixel sub-components arranged in several additional patterns including, e.g., zig-zags and a delta pattern common in camcorder view finders. While features of the present invention can be used with such pixel sub-component arrangements, since the RGB striping configuration is more common, the exemplary embodiments of the present invention will be explained in the context of using RGB striped displays.

Traditionally, each set of pixel sub-components for a pixel is treated as a single pixel unit. Accordingly, in most known systems luminous intensity values for all the pixel sub-components of a pixel are generated from the same portion of an image. Consider for example, the image represented by the grid 220 illustrated in FIG. 2C. In FIG. 2C each square represents an area of an image which is to be represented by a single pixel, e.g., a red, green and blue pixel sub-component of the corresponding square of the grid 230. In FIG. 2C a shaded circle is used to represent a single image sample from which luminous intensity values are generated. Note how a single sample 222 of the image 220 is used in known systems to generate the luminous intensity values for each of the red, green, and blue pixel sub-components 232, 233, 234. Thus, in such known systems, the RGB pixel sub-components are generally used as a group to generate a single colored pixel corresponding to a single sample of the image to be represented.

The light from each pixel sub-component group effectively adds together to create the effect of a single color whose hue, saturation, and intensity depends on the luminous intensity value of each of the three pixel sub-components. Say, for example, each pixel sub-component has a potential luminous intensity of between 0 and 255. If all three pixel sub-components are given 255 intensity, the pixel will be perceived as being white. However, if all three pixel sub-components are given a value turning off each of the three pixel sub-components, e.g., a value 0, the pixel will be perceived as black. By varying the respective intensities of each pixel sub-component, it is possible to generate millions of colors in between these two extremes.

Since, in the known system a single sample is mapped to a triple of pixel sub-components which are each ⅓ of a pixel in width, spatial displacement of the left and right pixel sub-components occurs since the centers of these elements are ⅓ from the center of the sample.

Consider for example that an image to be represented was a red cube with green and blue components equal to zero. As a result of the displacement between the sample and green image sub-component, when displayed on an LCD display of the type illustrated in FIG. 2A, the apparent position of the cube on the display will be shifted ⅓ of a pixel to the left of its actual position. Similarly, a blue cube would appear to be displaced ⅓ of a pixel to the right. Thus, known imaging techniques used with LCD screens can result in undesirable image displacement errors.

Text characters represent one type of image which is particularly difficult to accurately display given typical flat panel display resolutions of 72 or 96 dots (pixels) per inch (dpi). Such display resolutions are far lower than the 600 dpi supported by most printers and the even higher resolutions found in most commercially printed text such as books and magazines.

Because of the relatively low display resolution of most video display devices, not enough pixels are available to draw smooth character shapes, especially at common text sizes of 10, 12, and 14 point type. At such common text rendering sizes, gradations between different sizes and weights, e.g., the thickness, of the same typeface, are far coarser than their print equivalent.

The relatively coarse size of standard pixels tends to create aliasing effects which give displayed type characters jagged edges. For example, the coarse size of pixels tends to result in the squaring off of serifs, the short lines or ornaments at the ends, e.g., bottom, of strokes which form a typeface character. This makes it difficult to accurately display many highly readable or ornamental typefaces which tend to use serifs extensively.

Such problems are particularly noticeable in the stems, e.g., thin vertical portions, of characters. Because pixels are the minimum display unit of conventional monitors, it is not possible to display stems of characters using conventional techniques with less than one pixel stem weight. Furthermore, in such systems stem weight can only be increased a pixel at a time. Thus, stem weights leap from one to two pixels wide. Often one pixel wide character stems are too light, while two pixel wide character stems are too bold. Since creating a boldface version of a typeface on a display screen for small characters involves, in such known systems, going from a stem weight of one pixel to two pixels, the difference in weight between the two is 100%. In print, bold might typically be only 20 or 30 percent heavier than its equivalent regular or Roman face.

Prior work in the field of displaying characters have focused, in part, on the development of anti-aliasing technologies designed to improve the display of characters on CRT displays. A commonly used anti-aliasing technique involves using shades of gray for pixels which include edges of the character. In effect, this smudges shapes, reducing spatial frequency of the edges but better approximating the intended character shapes. While known anti-aliasing techniques can significantly improve the quality of characters displayed on a CRT display device, many of these techniques are ineffective when applied to LCD display devices.

A further issue is that such anti-aliasing techniques work reasonably well on large sizes of text, but at the sizes most suited for human reading—typically between 8 and 13 points—they have the effect of blurring the text. For the human reader, the effect is similar to trying to read with someone else's eyeglass prescription. The reader's eye tries continually to focus an image which is inherently unfocusable. This leads quickly to eyestrain and fatigue, making conventional anti-aliasing unsatisfactory in cases for sustained reading.

In view of the above, it is apparent that there is a need for new and improved methods and apparatus for displaying text on flat panel display devices. It is desirable that at least some of the new methods be suitable for use with existing display devices and computers. It is also desirable that at least some methods and apparatus be directed to improving the quality of displayed text on new computers using, e.g., new display devices and/or new methods of displaying text.

While the display of text, which is a special case of graphics, is of major concern in many computer applications, there is also a need for improved methods and apparatus for displaying other graphics, geometric shapes, e.g., circles, squares, etc., and captured images such as photographs, accurately and clearly.

SUMMARY OF THE PRESENT INVENTION

The present invention is directed to methods and apparatus for displaying images utilizing multiple distinct portions of an output device, e.g., an LCD display, to represent a single pixel of an image.

The inventors of the present application recognize the well-known principle that humans are much more sensitive to edges of luminance, where light intensity changes, than to edges of chrominance, where color intensity changes. This is why it is very difficult to read red text on a green background, for example. They also recognize the well-known principle that humans are not equally sensitive to the colors of red, green and blue. In fact, of 100 percent luminous intensity in a fully white pixel the red pixel sub-component contributes approximately 30% to the overall perceived luminance, green 60% and blue 10%.

In accordance with the present invention pixel sub-components which form a pixel are treated as separate luminous intensity sources. By utilizing pixel sub-components of a display to represent different portions of an image, greater resolution is achieved as compare to known displays where all the pixel sub-components of a pixel correspond to the same portion of an image. In the case of striped displays, the increase in effective resolution occurs in the dimension perpendicular to the direction of striping.

Treating pixel sub-components as distinct luminous intensity sources in accordance with the present invention may result in some degradation in chrominance quality as compared to known display techniques. Such degradation occurs as a result of using different image portions to determine the luminous intensity values of each pixel sub-component.

As discussed above humans are more sensitive to edges of luminance than of chrominance. Accordingly, the present invention can provide significant improvements in the quality of images, compared to known rendering techniques, even when taking into consideration the negative impact the techniques of the present invention may have on color quality.

As a result of treating RGB pixel sub-components as distinct luminous intensity sources, color fringing effects may be encountered. Various features of the present invention are directed to processing data, e.g., luminous intensity values, representing bitmapped images to detect color errors, e.g., color fringing effects. Color errors which are likely to be noticeable and/or distracting are of particular concern.

Various features of the present invention are directed to performing color processing operations on images to lessen or compensate for color errors which are likely to be noticeable and/or distracting to a viewer.

Foreground and background colors are used to display many images including, e.g., text. A foreground color pixel is achieved by using specific red, green and blue pixel sub-component luminous intensity values, $R_F$, $G_F$, $B_F$ for each of the red, green and blue pixel sub-components which make up a foreground color pixel. A background color pixel is achieved by using specific red, green and blue pixel sub-component luminous intensity values, $R_B$, $G_B$, $B_B$ for each of the red, green and blue pixel sub-components which make up a background color pixel.

In accordance with one color error detection method of the present invention, each pixel's pixel sub-component luminous intensity values are compared to a range of luminous intensity values. The range of luminous intensity values to which a pixel sub-component's luminous intensity value is compared is determined as a function of the foreground and background pixel sub-component luminous intensity values of a corresponding pixel sub-component.

In one particular implementation, red pixel sub-component luminous intensity values which fall outside the range of pixel sub-component luminous intensity values extending from $R_F$ to $R_B$, and including $R_F$ and $R_B$, are detected and considered color errors upon which a color correction or color error reduction operation should be performed. In order to reduce or correct such detected color errors, the red pixel sub-component luminous intensity value is adjusted so that it is closer to, or falls within, the range of values extending from $R_F$ to $R_B$ and including $R_F$ and $R_B$. In one particular embodiment, the value of the red pixel sub-component is clamped, i.e., set to, the closer one of the values $R_F$ or $R_B$ when it is detected that the red pixel sub-component luminous intensity value is outside the range of luminous intensity values to which it is compared.

Potentially noticeable or significant color errors in green and blue pixel sub-components are detected and corrected in accordance with some embodiments, in the same manner as described above with regard to the red pixel sub-component luminous intensity value. However, when processing green pixel sub-component luminous intensity values, the green pixel sub-component luminous intensity values $G_F$ and $G_B$ are used in place of the $R_F$ and $R_B$ values discussed above. Accordingly, the luminous intensity values $R_F$ and $R_B$ are used to determine the range of luminous intensity values to which a red pixel sub-component luminous intensity value is compared. Similarly, when processing blue pixel sub-component luminous intensity values, the blue pixel sub-component luminous intensity values $B_F$ and $B_B$ are used in place of $R_F$ and $R_B$. Thus, the luminous intensity values $B_F$ and $B_B$ are used to determine the range of luminous intensity values to which a blue pixel sub-component luminous intensity value is compared.

The above described color error detection and correction/compensation technique has the advantage of being relatively simple to implement while improving perceived image quality. In addition, it allows for the red, green and blue pixel sub-component values to be processed independently allowing for the detection and correction operations to be performed in parallel for different pixel sub-components of the same pixel or on only some of the pixel sub-components, e.g., the red and green sub-components.

While the color error detection and correction/compensation techniques of the present invention are described primarily in the context of striped displays, they can be applied to other display configurations where multiple pixel sub-components are used to represent a single pixel.

Numerous additional features, embodiments, and advantages of the methods and apparatus of the present invention are set forth in the detailed description which follows.

DETAILED DESCRIPTION

As discussed above, the present invention is directed to methods and apparatus for displaying images, e.g., text and/or graphics, on display devices which are capable of utilizing multiple distinct sections of an output device, e.g., the pixel sub-components of a liquid crystal display, to represent a single pixel of an image.

Various methods of the present invention are directed to using each pixel sub-component as a separate independent luminous intensity source as opposed to treating the set of RGB pixel sub-components which comprise a pixel as a single luminous intensity unit. This allows for a display device with RGB horizontal or vertical striping to be treated as having an effective resolution in the dimension perpendicular to the striping that is up to 3 times greater than in the other dimension. Various apparatus of the present invention are directed to display devices and control apparatus which take advantage of the ability to individually control sub-pixel components.

Figure 4:
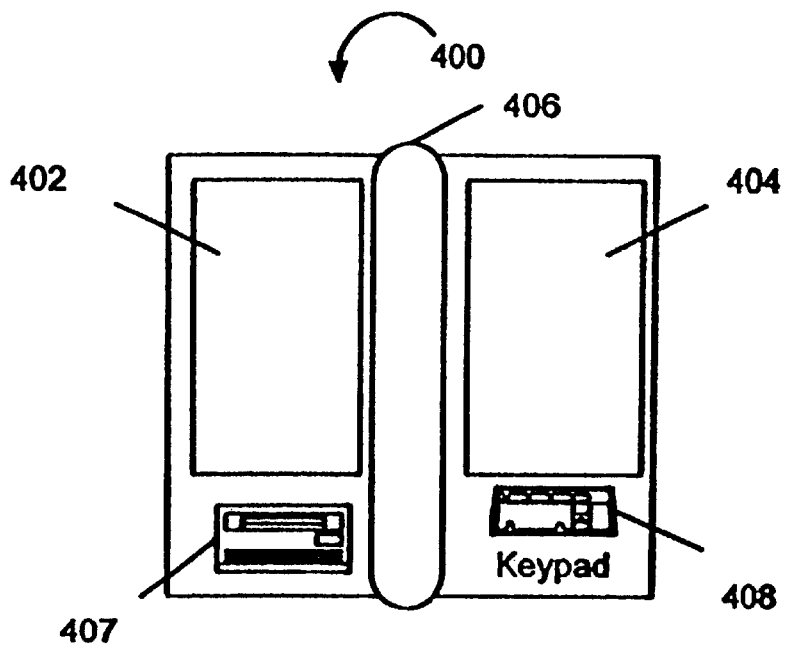
FIG. 4 illustrates an electronic book with flat panel displays arranged in a portrait arrangement in accordance with one embodiment of the present invention.

FIG. 4 illustrates a computerized electronic book device 400 implemented in accordance with one embodiment of the present invention. As illustrated in FIG. 4, the electronic book 400 comprises first and second display screens 402, 404 for displaying odd and even pages of a book, respectively. The electronic book 400 further comprises an input device, e.g., keypad or keyboard 408 and a data storage device, e.g., CD disk drive 407. A hinge 406 is provided so that the electronic book 400 can be folded protecting the displays 402, 404 when not in use. An internal battery may be used to power the electronic book 400. Similarly, other portable computer embodiments of the present invention may be powered by batteries.

Figure 5:
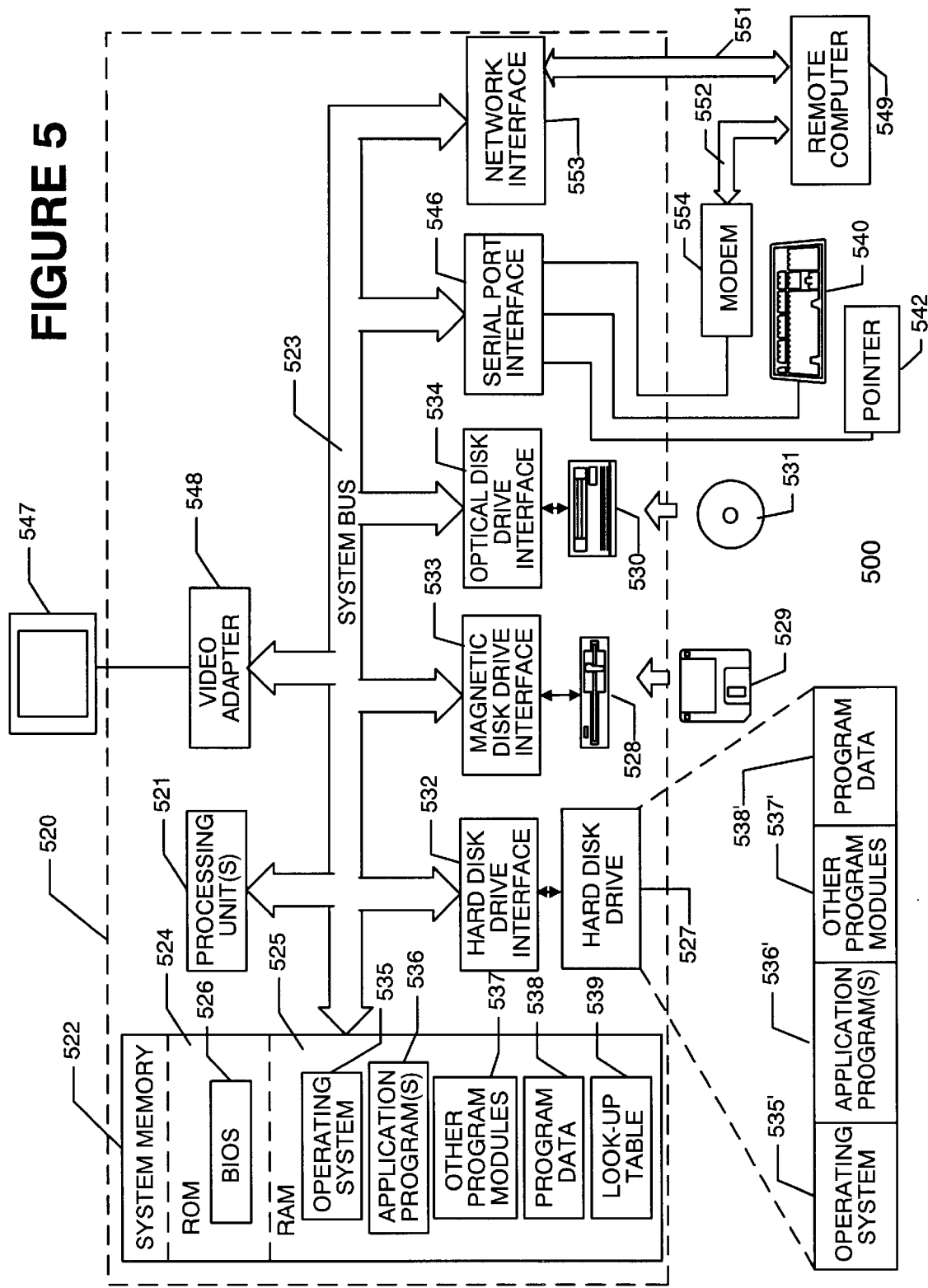
FIG. 5 illustrates a computer system implemented in accordance with the present invention.

FIG. 5 and the following discussion provide a brief, general description of an exemplary apparatus in which at least some aspects of the present invention may be implemented. Various methods of the present invention will be described in the general context of computer-executable instructions, e.g., program modules, being executed by a computer device such as the electronic book 400 or a personal computer. Other aspects of the invention will be described in terms of physical hardware such as, e.g., display device components and display screens.

The methods of the present invention may be effected by other apparatus than the specific described computer devices. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 5, an exemplary apparatus 500 for implementing at least some aspects of the present invention includes a general purpose computing device, e.g., personal computer 520. The personal computer 520 may include a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory 522 may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 527, magnetic disk 529, (magneto) optical disk 531, ROM 524 or RAM 525, such as an operating system 535, one or more application programs 536, other program modules 537, luminous intensity value look-up table 539 and/or program data 538 for example. Operating system 535 includes routines for rendering images, for detecting color errors, and for performing color error correction and/or reduction operations as will be discussed below. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus 523. However, input devices may be connected by other interfaces, such as a parallel port, a game port or a universal serial bus (USB). A monitor 547 or other type of display device may also be connected to the system bus 523 via an interface, such as a video adapter 548 for example. The apparatus 500 may be used to implement the book 400 through the addition of a second display device. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520. The logical connections depicted in FIG. 5 include a local area network (LAN) 551 and a wide area network (WAN) 552, an intranet and the Internet.

When used in a LAN, the personal computer 520 may be connected to the LAN 551 through a network interface adapter (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 7A:
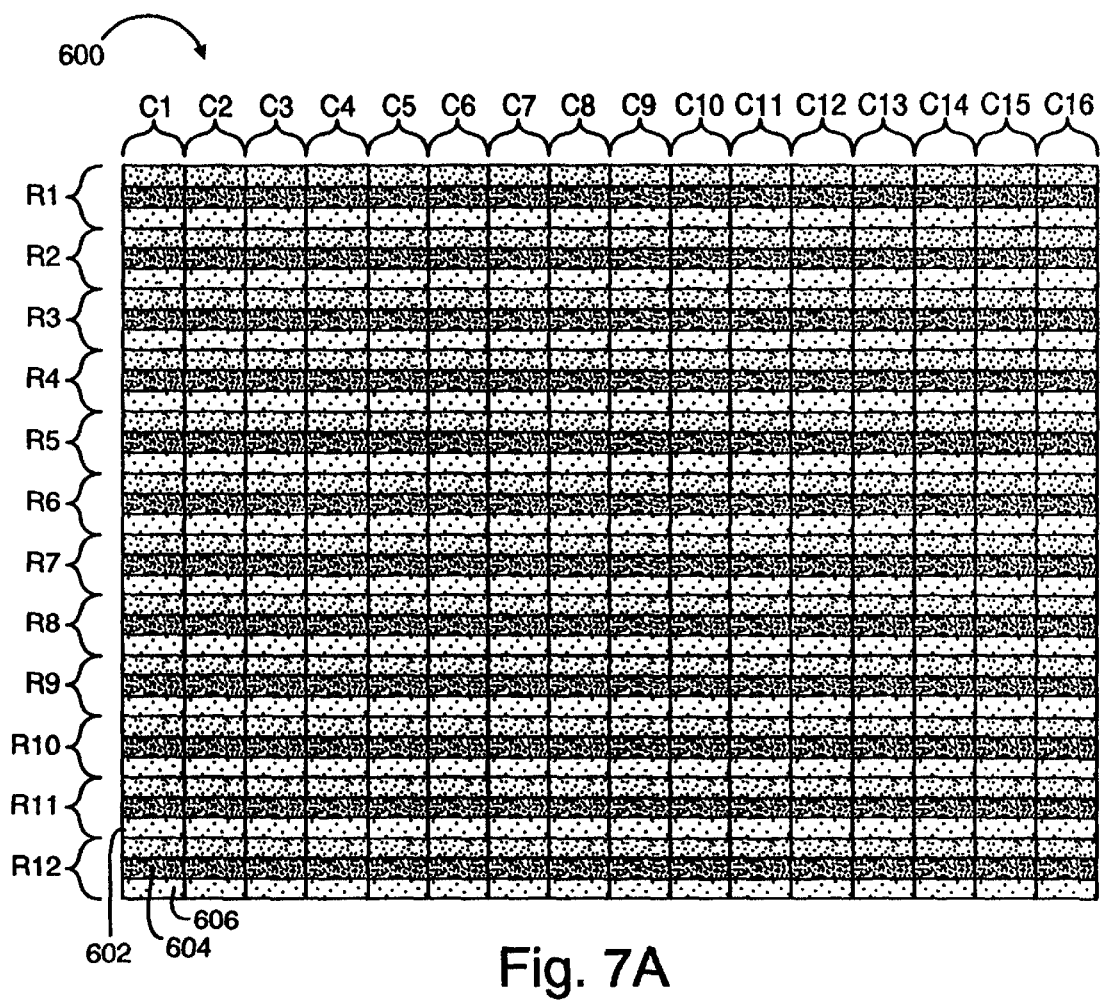
FIG. 7A illustrates a color flat panel display screen implemented in accordance with the present invention.

FIG. 7A illustrates a display device 600 implemented in accordance with an embodiment of the present invention. The display device 600 is suitable for use in, e.g., portable computers or other systems where flat panel displays are desired. The display device 600 may be implemented as an LCD display. In one embodiment the display and control logic of the known computer 100 are replaced by the display device 600 and display control logic, e.g., routines, of the present invention to provide a portable computer with horizontal RGB striping and pixel sub-components which are used to represent different portions of an image.

As illustrated, the display device 600 includes 16 columns of pixel elements C1–C16 and 12 rows of pixel elements R1–R12 for a display having 16×12 pixels. The display 600 is arranged to be wider than it is tall as is the case with most computer monitors. While the display 600 is limited to 16×12 pixels for purposes of illustration in the patent, it is to be understood that monitors of the type illustrated in FIG. 7A can have any number of vertical and horizontal pixel elements allowing for displays having, e.g., 640×480, 800× 600, 1024×768 and 1280×1024 ratios of horizontal to vertical pixel elements as well as ratios resulting in square displays.

Each pixel element of the display 600 includes 3 sub-components, a red pixel sub-component 602, a green pixel sub-component 604, and a blue pixel sub-component 606. In the FIG. 7A embodiment, each pixel sub-component 602, 604, 606 has a height that is equal to, or approximately equal to, ⅓ the height of a pixel and a width equal to, or approximately equal to, the width of the pixel.

In the monitor 600, the RGB pixel sub-components are arranged to form horizontal stripes. This is in contrast to the vertical striping arrangement used in the previously discussed monitor 200. The monitor 600 may be used, e.g., in particular graphics applications where, because of the application, it is desirable to have a greater vertical, as opposed to horizontal resolution.

Figure 7B:
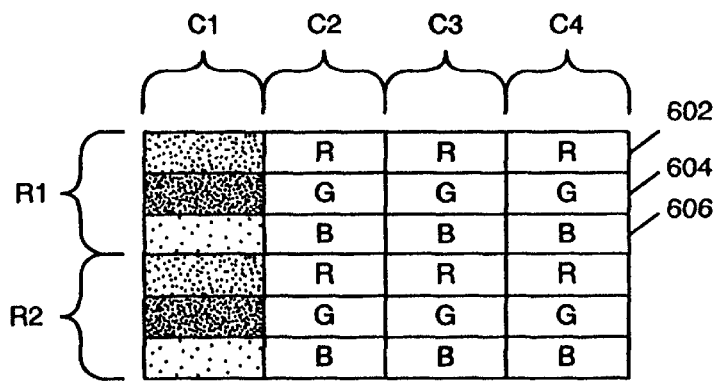
FIG. 7B illustrates a portion of the display screen of FIG. 7A.

FIG. 7B illustrates the upper left hand portion of the display 600 in greater detail. In FIG. 7B, the horizontal RGB striping pattern is clearly visible with the letters R, G and B being used to indicate correspondingly colored pixel sub-components.

While the display 7A may be desirable for certain graphics applications, vertical striping has the distinct advantage, when used according to the present invention, of allowing for character stems which can be adjusted in width ⅓ of a pixel at a time. Thus, using a display device such as the device 200 or 700 with a vertical striping arrangement in conjunction with the display methods of the present invention, can provide higher quality text than arrangements which limit stem width adjustments to 1 pixel increments.

Another advantage of vertical striping is that it allows for horizontal adjustments in character spacing in increments of less than a pixel size in width, e.g., ⅓ of a pixel size increments. Character spacing is a text characteristic which is important to legibility. Thus, using vertical striping can produce improved text spacing as well as finer stem weights.

Figure 8:
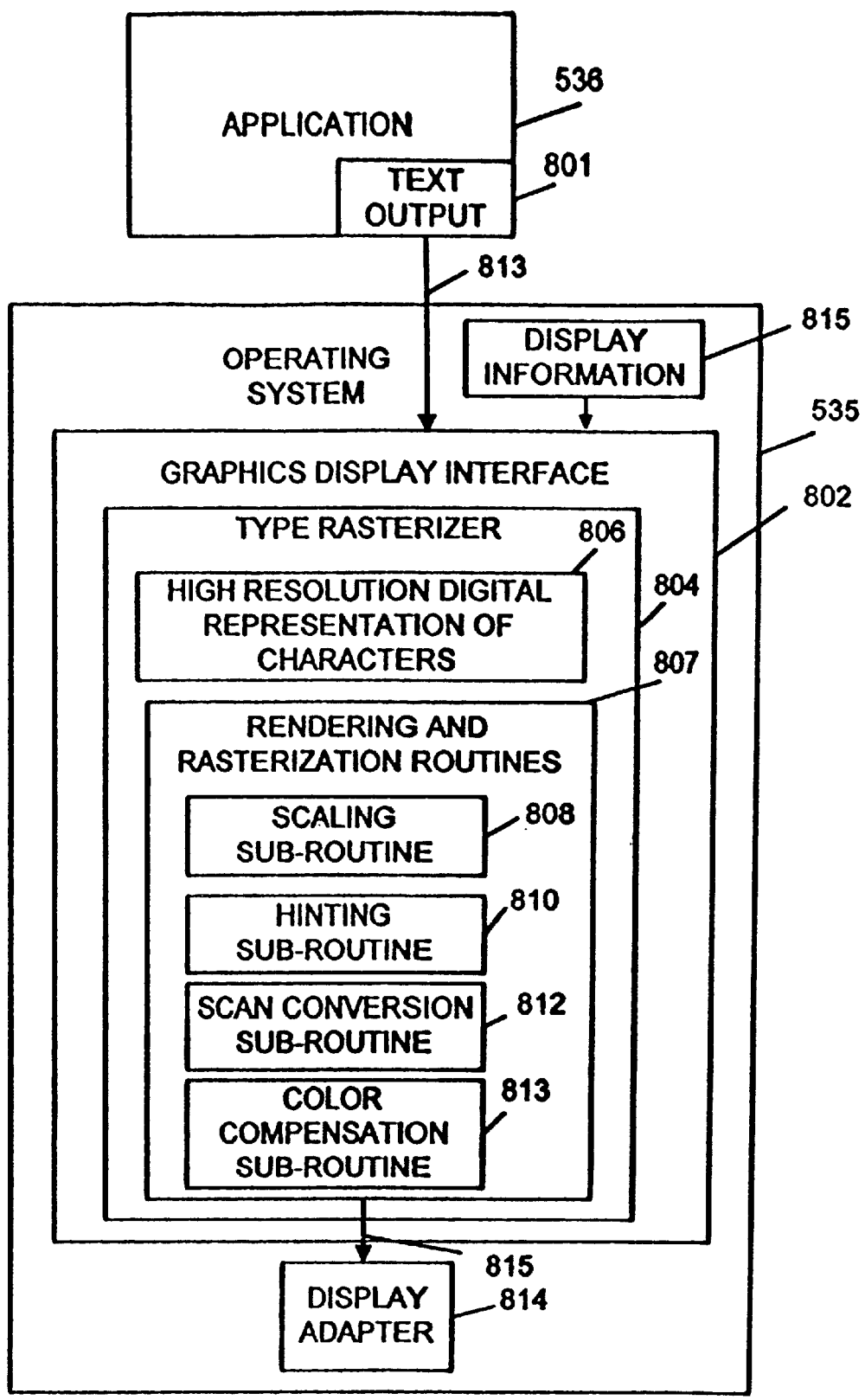
FIG. 8 illustrates various elements, e.g., routines, included in the memory of the computer system of FIG. 5, used for rendering text images on the computer system's display.

FIG. 8 illustrates various elements, e.g., routines, included in the memory of the computer system of FIG. 5, used to render text images on the computer system's display in accordance with the present invention.

As illustrated, the application routine 536, which may be, e.g., a word processor application, includes a text output sub-component 801. The text output sub-component 801 is responsible for outputting text information, as represented by arrow 813, to the operating system 535 for rendering on the display device 547. The text information includes, e.g., information identifying the characters to be rendered, the font to be used during rendering, and the point size at which the characters are to be rendered.

The operating system 535 includes various components responsible for controlling the display of text on the display device 547. These components include display information 815, a display adapter 814, and a graphics display interface 802. The display information 815 includes, e.g., information on scaling to be applied during rendering and/or foreground/ background color information. Foreground/background color information may, alternatively, be provided by the application 536. The display adapter receives bitmap images from the graphics display interface 802 and generates video signals which are supplied to video adapter 548 for optical presentation by the display 547. The arrow 813 represents passing of the bitmap images from the graphics display interface 802 to the display adapter 814.

The graphics display interface 802 includes routines for processing graphics as well as text. Element 804 is a type rasterizer used to process text. The type rasterizer 804 is responsible for processing the text information obtained from the application 536 and generating a bitmap representation therefrom. The type rasterizer 804 includes character data 806 and rendering and rasterization routines 807.

The character data 806 may include, e.g., vector graphics, lines, points, curves and/or other types of contour information, which provide a high resolution digital representation of one or more sets of characters. Thus, character data 806 may be in the form of geometric image representations. The character data 806 represents foreground/ background information in that portions of images inside character outlines are intended to correspond to the foreground color being used and the portions of images outside a character's outline are intended to correspond to the background color being used.

While examples of the image processing techniques of the present invention are described in the context of geometric image data, they can also be used with bitmapped image data.

Figure 3:
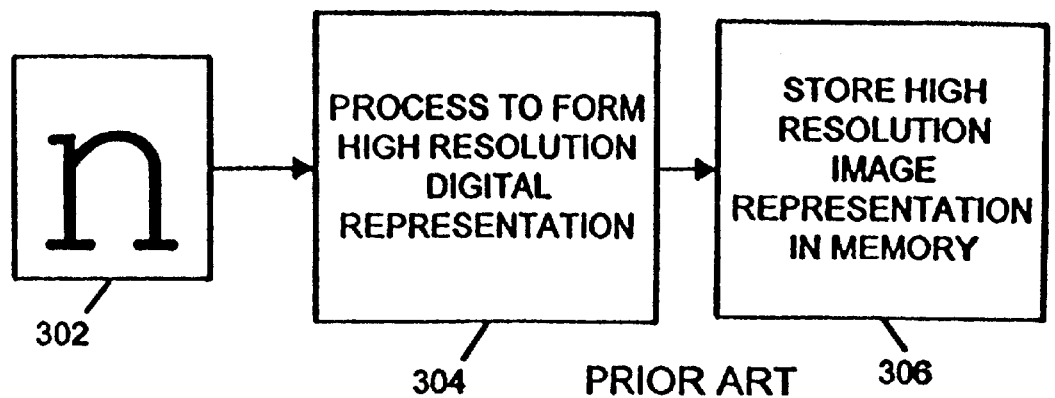
FIG. 3 illustrates known steps involved in preparing and storing character information for use in the subsequent generation and display of text.

As illustrated in FIG. 3, it is known to process text characters 302 to generate high resolution digital representations thereof, such as the data 806, which can be stored in memory for use during text generation. Accordingly, the generation 304 and storage 306 of data 806, will not be discussed herein in any detail.

The rendering and rasterization routines 807 include a scaling sub-routine 808, a hinting sub-routine 810, a scan conversion sub-routine 812 and a color compensation sub-routine 813. While performing scaling, hinting and scan conversion operations to render text images is common place, the routines and sub-routines of the present differ from known routines in that they take into consideration, utilize, or treat a screen's RGB pixel sub-components as separate luminous intensity entities which can be used to represent different portions of an image to be rendered. The color compensation sub-routine 813 is responsible for identifying color errors in bitmap images created by the scan conversion sub-routine 812. It is also responsible for performing color compensation adjustments on the bitmap images to reduce, eliminate, or compensate for undesirable color fringing effects that may result from treating each of the three color sub-components of a pixel as separate luminous intensity elements. The operations performed by each of the sub-routines 808, 810, 812, and 813 of the present invention will be explained in detail below.

Figure 9A:
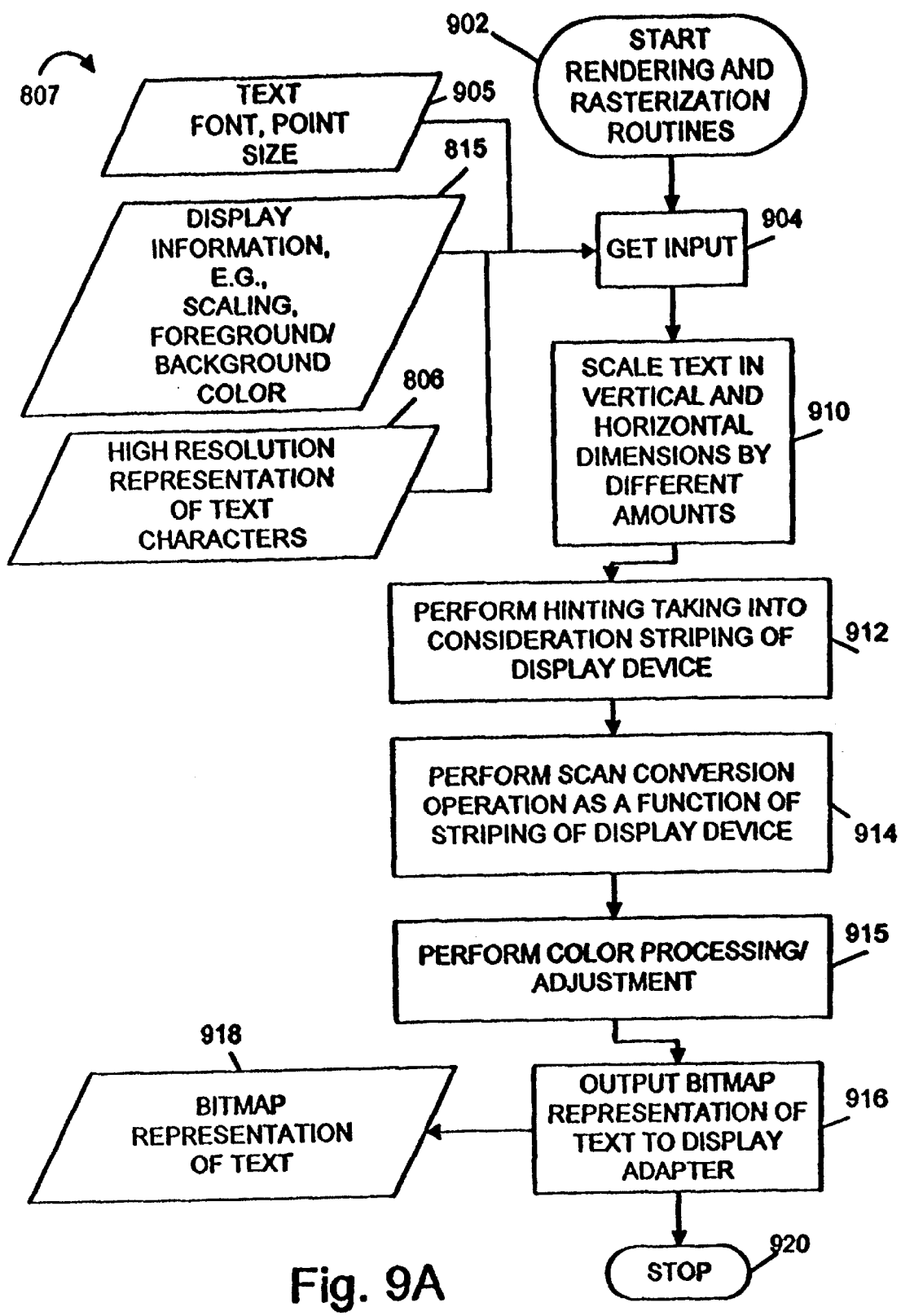
FIG. 9A illustrates a method of rendering text for display in accordance with one embodiment of the present invention.

FIG. 9A illustrates the rendering and rasterization routines 807 used for rendering text for display in accordance with the present invention. As illustrated, the routines 807 begin in step 902 wherein the routines are executed, e.g., under control of the operating system 535, in response to the receipt of text information from the application 536. In step 904 input is received by text rendering and rasterization routines 807. The input includes text, font, and point size information 905 obtained from the application 536. In addition, the input includes display information 815 The display information may include, e.g., pixel pattern information, scaling or supersampling information, foreground/background color information, pixel size information, etc. Display information 815 maybe obtained from, e.g., monitor settings and/or display device driver information stored in memory. The input obtained in step 904 also includes the character data 806. As discussed above, character data 806 includes a high resolution representation, e.g., in the form of lines, points, curves, and/or other contour information of the text characters to be displayed.

With the input received in step 904, operation proceeds to step 910 wherein the scaling subroutine 808 is used to perform a scaling operation. In accordance with the present invention scaling or, alternatively, supersampling, is performed as a function of the direction of pixel sub-component striping, number of pixel sub-components included in each pixel element, pixel pattern information, and/or the type of image filtering to be performed as part of the scan conversion process. In one particular embodiment, the high resolution character data 806, e.g., the line and point representation of characters to be displayed as specified by the received text and font information, is scaled or sampled in the direction perpendicular to the striping at a greater rate than in the direction of the striping. This allows for subsequent image processing operations to take advantage of the higher degree of resolution that can be achieved by using individual pixel sub-components as independent luminous intensity sources in accordance with the present invention. It also allows for various image filtering operations to be performed as part of the scan conversion process.

In various embodiments, when displays of the type illustrated in FIG. 7A are used as the device upon which data is to be displayed, scaling or supersampling is performed in the vertical direction at a rate that is greater than that performed in the horizontal direction. When screens with vertical striping, e.g., screens illustrated in FIG. 2A, are used, scaling or supersampling is performed in the horizontal direction at a rate that is greater than that performed in the vertical direction.

The difference in scaling or supersampling between the vertical and horizontal image directions can vary depending on the display used and the subsequent scan conversion and hinting processes to be performed. Display information including scaling information obtained in step 904 is used in step 910 to determine the scaling to be performed in a given embodiment.

In some embodiments of the present invention, scaling or supersampling is performed in the direction perpendicular to the striping at a rate which is unrelated to the number of pixel sub-components which form each pixel. For example, in one embodiment where RGB pixel sub-components are used to form each pixel, scaling is performed in the direction perpendicular to the striping at a rate 20 times the rate at which scaling is performed in the direction of the striping. In most cases, the scaling or supersampling of characters or images is, but need not be, performed in the direction perpendicular to the striping at a rate which allows further dividing the red, green and blue stripes to support weighted filter operations.

Figure 1:
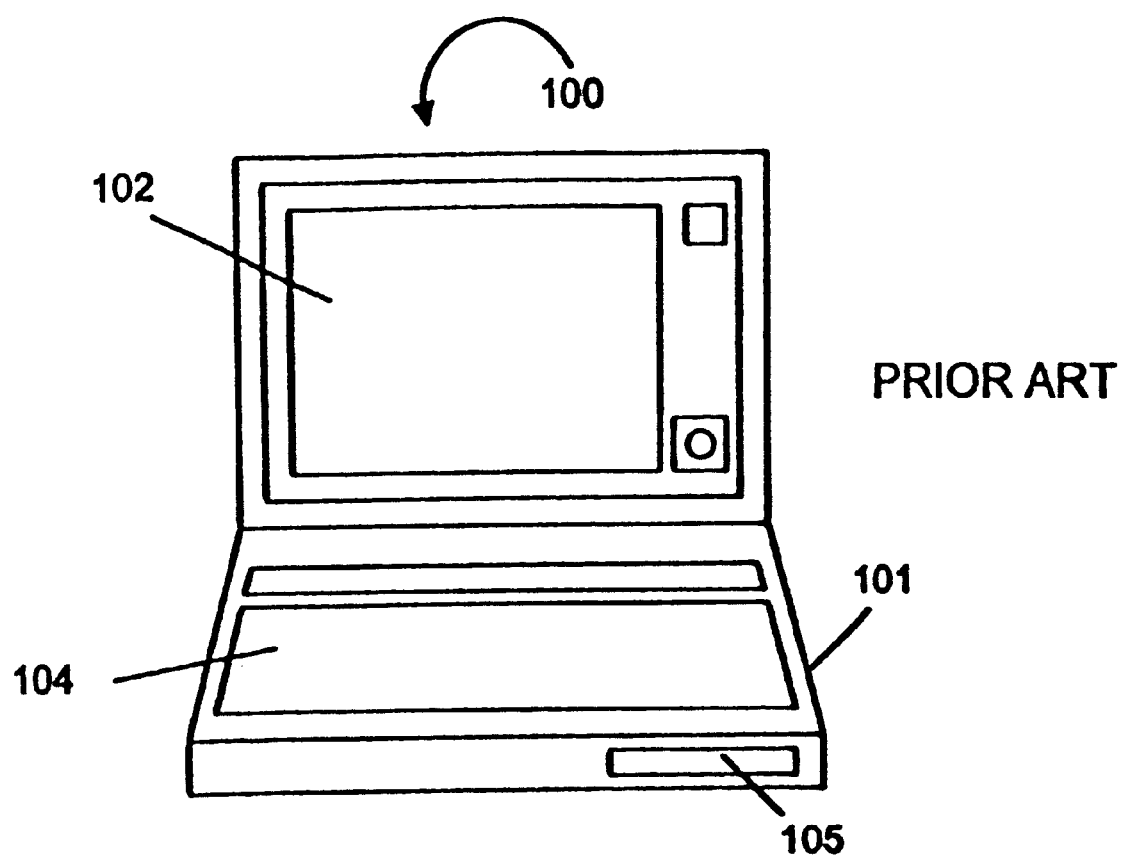
FIG. 1 is a diagram of a known portable computer.
Figure 2A:
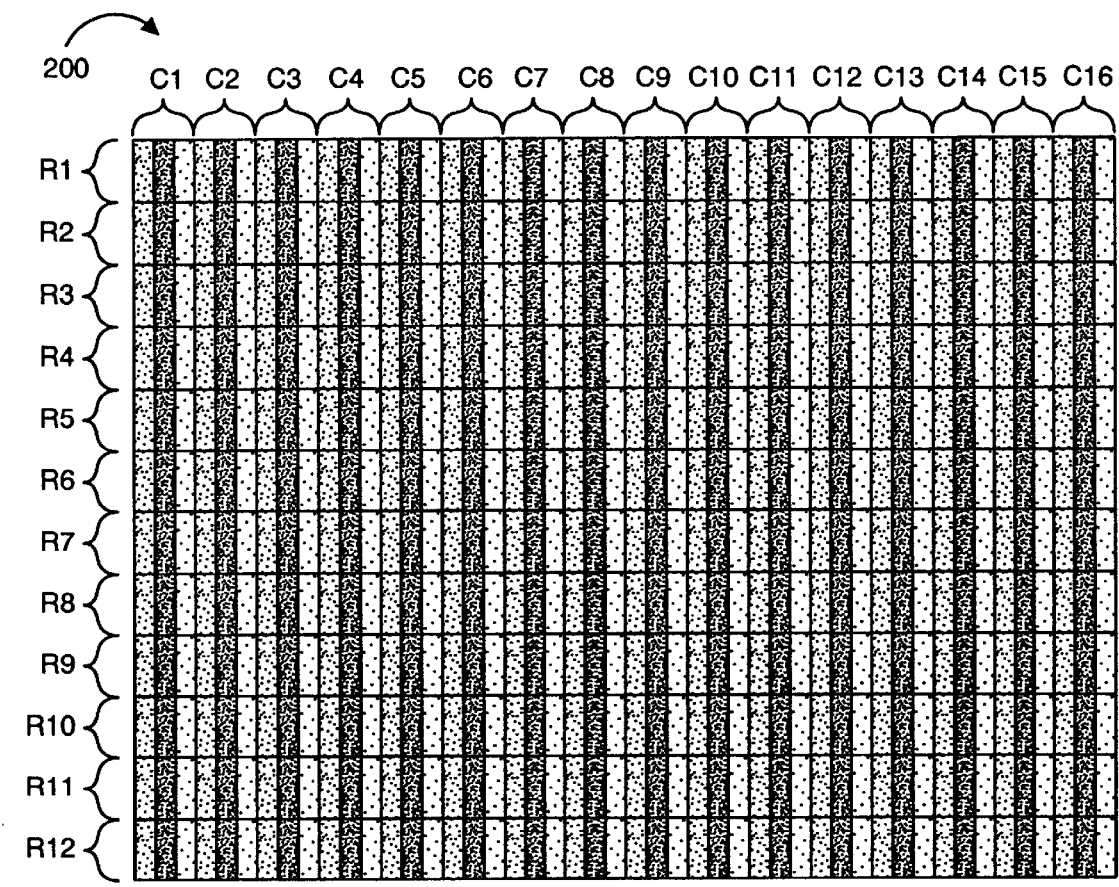
FIG. 2A illustrates a known LCD screen.
Figure 10A:
FIGS. 10A and 10B illustrate scaling operations performed in accordance with various exemplary embodiments of the present invention.
Figure 10A:

FIG. 10A illustrates a scaling operation performed on a high resolution representation of the letter i 1002 in anticipation of the display of the letter on a monitor with horizontal striping such as the one illustrated in FIG. 2A. Note that in this example scaling in the horizontal (X) direction is applied at a rate of ×1 while scaling in the vertical (Y) direction is applied at a rate of ×1. This results in a scaled character 1004 that is 3 times taller but just as wide as the original character 1002. Supersampling at a rate of ×3 in the vertical dimension and ×1 in the horizontal dimension can be performed as an alternative to the scaling operation.

Figure 2B:
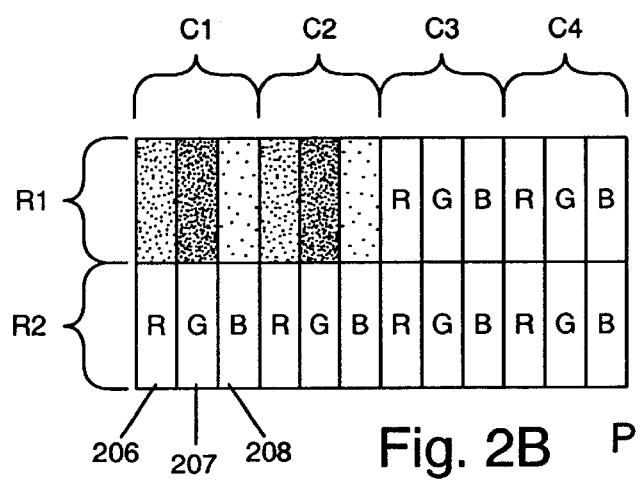
FIG. 2B illustrates a portion of the known screen illustrated in FIG. 2A in greater detail than the FIG. 2A illustration.
Figure 10B:
Figure 10B:
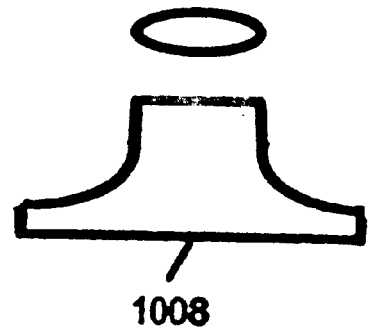

FIG. 10B illustrates a scaling operation performed on a high resolution representation of the letter i 1002 in anticipation of the display of the letter on a monitor with vertical striping such as the one illustrated in FIG. 2. Note that in this example scaling in the horizontal (X) direction is applied at a rate of ×3 while scaling in the vertical (Y) direction is applied at a rate of ×1. This results in a scaled character 1008 that is just as tall as the original character 1002 but three times wider. Supersampling at a rate of ×3 in the horizontal dimension and ×1 in the vertical dimension could be performed as an alternative to scaling.

Scaling or supersampling by other amounts is possible. For example, in cases where a weighted scan conversion operation is to be used in determining luminous intensity values for pixel sub-components as part of a subsequent scan conversion operation, scaling is performed as a function of the RGB striping and filter weights used to filter the image during the scan conversion operation. In one particular embodiment, this results in scaling in the direction perpendicular to the striping at a rate of 10× while scaling is performed at a rate of 1× in the direction parallel to the striping.

Referring once again to FIG. 9, once the scaling operation is completed in step 910, operation proceeds to step 912 in which hinting of the scaled image is performed, e.g., by executing the hinting sub-routine 810. The term grid-fitting is sometimes used to describe the hinting process.

Figure 11A:
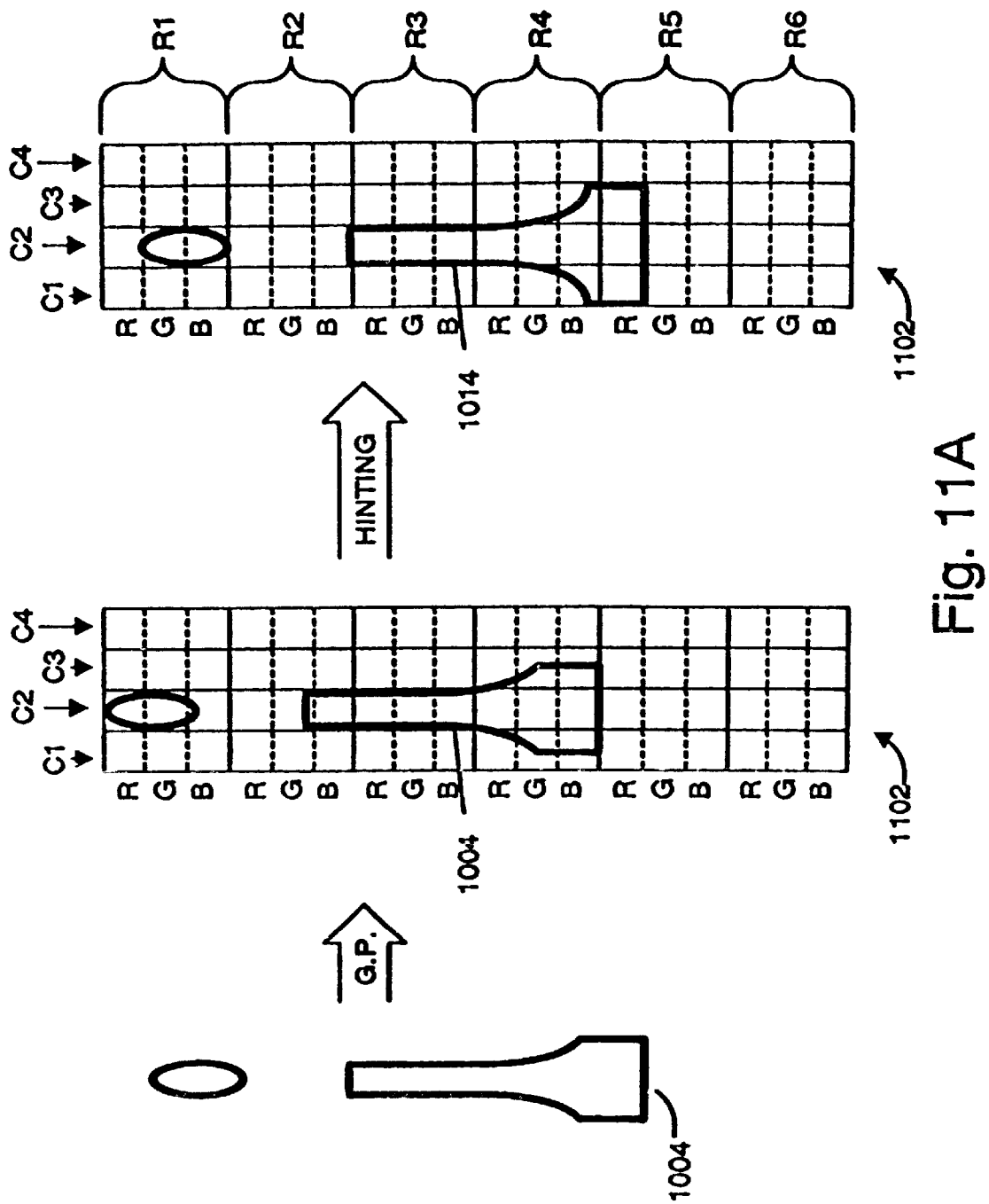
FIGS. 11A and 11B illustrate hinting operations performed in accordance with various exemplary embodiments of the present invention.
Figure 11B:
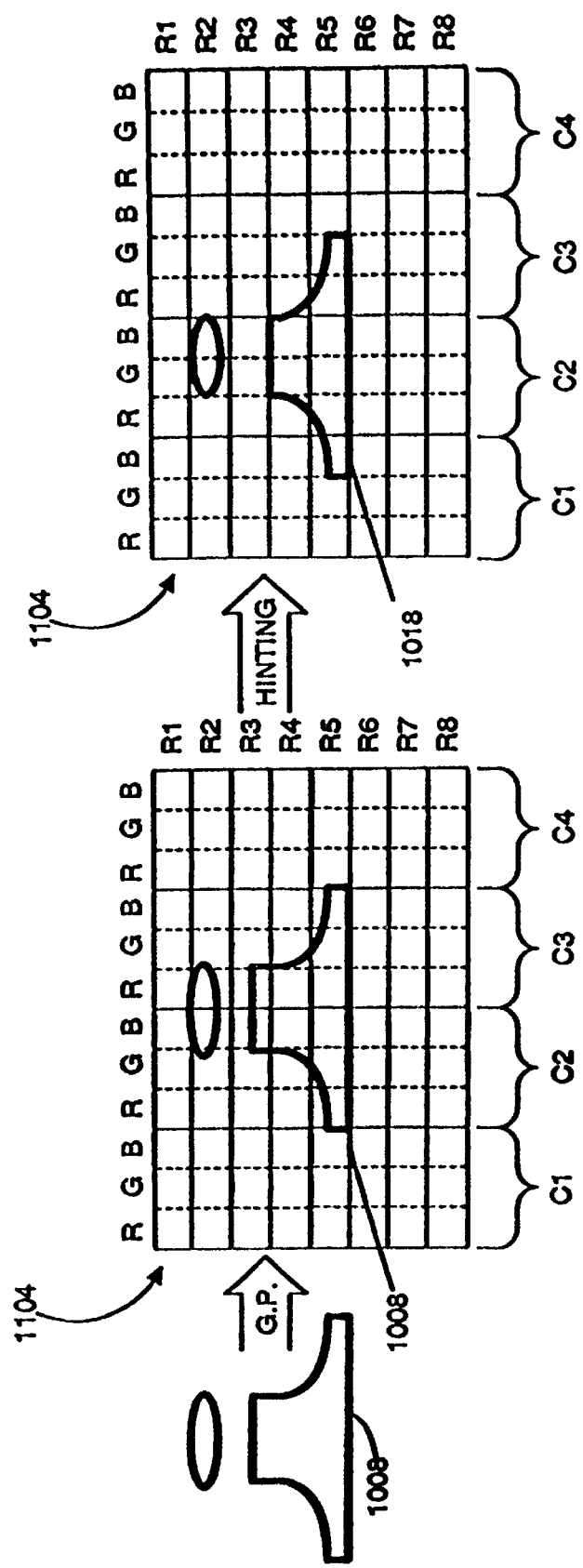

Hinting operations are illustrated in FIGS. 11A and 11B. FIG. 11A illustrates the hinting of the scaled character 1004 which is intended to be displayed on a monitor with horizontal striping. FIG. 11B illustrates the hinting of the scaled character 1008 which is intended to be displayed on a monitor with vertical striping.

Hinting involves the alignment of a scaled character, e.g., the character 1004, 1008 within a grid 1102, 1104 that is used as part of a subsequent scan conversion operation. It also involves the distorting of image outlines so that the image better conforms to the shape of the grid. The grid is determined as a function of the physical size of a display device's pixel elements.

Unlike the prior art which failed to take into consideration pixel sub-component boundaries during hinting, the present invention treats pixel sub-component boundaries as boundaries along which characters can and should be aligned or boundaries to which the outline of a character should be adjusted.

Hinting, implemented in accordance with the present invention as a function of pixel sub-component boundaries, can be used to reduce color distortions, e.g., color artifacts, that may be introduced as the result of treating each of the different color pixel sub-components as an independent luminous intensity source. In addition to the luminous intensity that is controlled, each pixel sub-component has a hue and a saturation that are normally constants determined by a color filter incorporated into the color display. When the luminous intensity of a sub-pixel is varied, the color of the pixel overall is also varied. To the extent that these color variations introduced by treating pixel sub-components as independent luminous sources attract the attention of the human eye, they become artifacts that can distract from the function of the display, which is to accurately recreate images for the human eye. It is desirable that artifacts that are likely to distract be avoided or minimized.

Adjusting the placement of an edge, e.g., as part of the hinting process, can have a significant effect in terms of reducing or eliminating color artifacts. For frequently used individual images, e.g., characters, edge placement information can be determined by a skilled typographer and stored in memory as part of the font information used for character generation. During the hinting operation, such specific character placement information, when available, is utilized to determine appropriate character placement during the hinting process. Images for which specific placement information is not stored may be aligned with various pixel and pixel sub-component boundaries according to stored, generally applicable hinting rules.

The hinting process of the present invention involves aligning the scaled representation of a character within the grid, e.g., along or within pixel and pixel sub-component boundaries in a manner intended to optimize the accurate display of the character using the available pixel sub-components. In many cases, this involves aligning the left edge of a character stem with a left pixel or pixel component boundary and aligning the bottom of the character's base along a pixel component or sub-component boundary.

Experimental results have shown that in the case of vertical striping, characters with stems aligned so that the character stem has a blue or green left edge generally tend to be more legible than characters with stems aligned to have a red left edge. Accordingly, in at least some embodiments, during hinting of characters to be displayed on a screen with vertical striping, blue or green left edges for stems are favored over red left edges as part of the hinting process.

In the case of horizontal striping, characters aligned so that the bottom of the character base or a significant horizontal character component has a red or blue bottom edge generally tend to be more legible than characters with bases aligned to have a green bottom edge. Accordingly, during hinting of characters to be displayed on a screen with horizontal striping, in at least some embodiments, red or blue bottom edges are favored over green bottom edges as part of the hinting process.

FIG. 11A illustrates the application of a hinting operation to the scaled image 1104. As part of the hinting process, the scaled image 1104 is placed on a grid 1102 and its position and outline are adjusted to better conform to the grid shape and to achieve a desired degree of character spacing. The letters "G.P." in FIGS. 11A and 11B indicate the grid placement step while the term hinting is used to indicate the outline adjustment and character spacing portions of the hinting process.

Note that in FIG. 11A where the image 1004 is hinted for display on a screen having horizontal striping, the scaled image 1004 is positioned along the R/G pixel sub-component boundary so that the base of the character 1004 has a red bottom edge. In addition, the image's outline is adjusted so that rectangular portions of the image adjoin pixel sub-component boundaries. This results in the hinted image 1014. The distance between the character image and left and right side bearing points (not shown) used for determining character position and spacing on the screen are also adjusted as a function of pixel sub-component boundaries. Thus, in various embodiments of the present invention, character spacing is controlled to a distance corresponding to the width of a pixel sub-component, e.g., ⅓ of a pixel width.

In FIG. 11B where the image 1008 is hinted for display on a screen having vertical striping, the scaled image 1008 is positioned along the R/G pixel sub-component boundary so that the left edge of the stem of the hinted character 1018 has a green left edge. The shape of the character is also adjusted as well as the position of the character on the grid. Character spacing adjustments are also made.

Once the hinting process is completed in step 912, operation proceeds to step 914 wherein a scan conversion operation is performed in accordance with the present invention, e.g., by executing the scan conversion sub-routine 812.

Figure 2C:
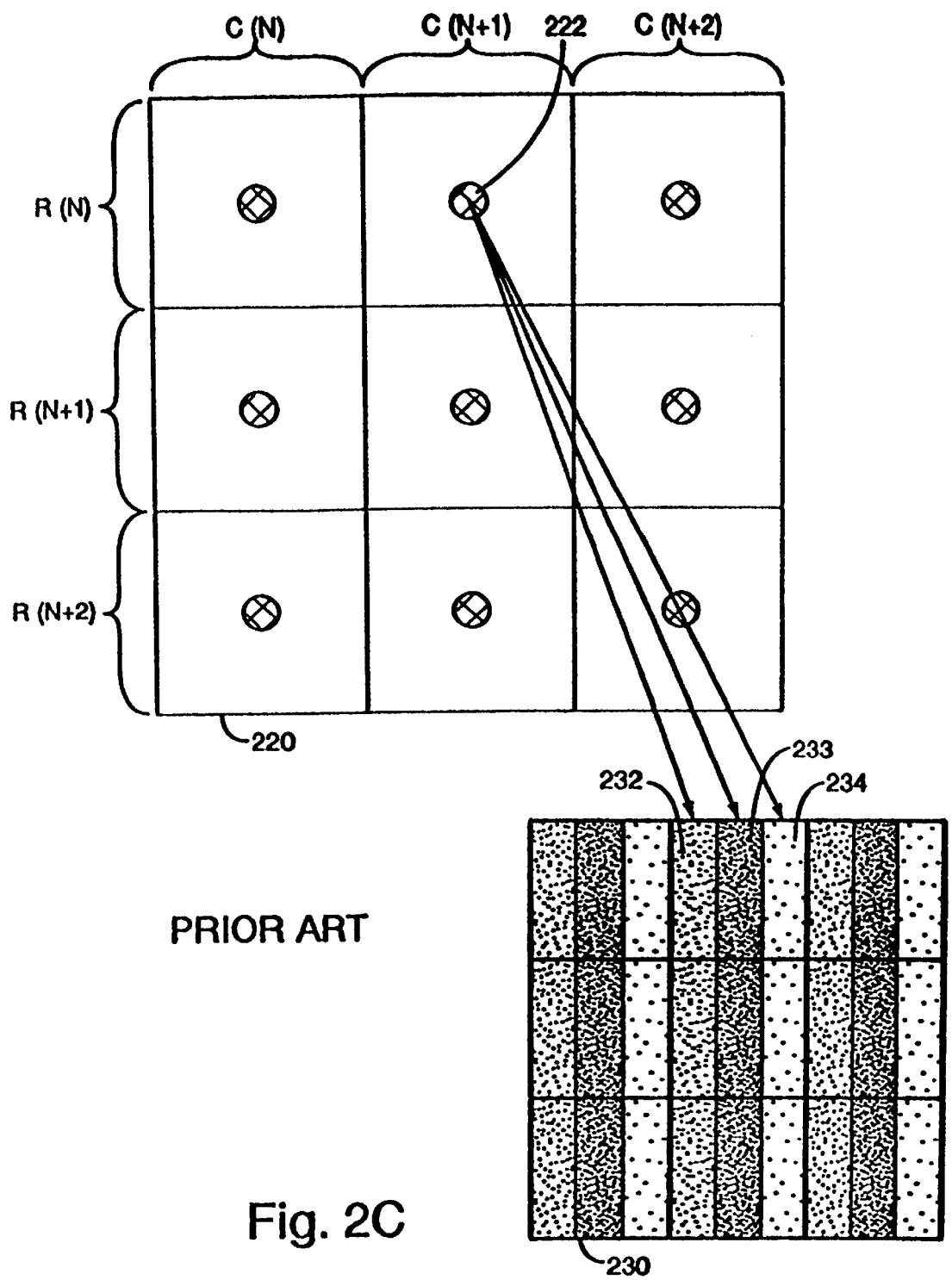
FIG. 2C illustrates an image sampling operation performed in known systems.

Scan conversion involves the conversion of the scaled geometry representing a character into a bitmap image. Conventional scan conversion operations treat pixels as individual units into which a corresponding portion of the scaled image can be mapped. Accordingly, in the case of conventional scan conversion operations, the same portion of an image is used to determine the luminous intensity values to be used with each of the RGB pixel sub-components of a pixel element into which a portion of the scaled image is mapped. FIG. 2C is exemplary of a known scan conversion process which involves sampling an image to be represented as a bitmap and generating luminous intensity values from the sampled values.

In accordance with the present invention, the RGB pixel sub-components of a pixel are treated as independent luminous intensity elements. Accordingly, each pixel sub-component is treated as a separate luminous intensity component into which a separate portion of the scaled image can be mapped. Thus, the present invention allows different portions of a scaled image to be mapped into different pixel sub-components providing for a higher degree of resolution than is possible with the known scan conversion techniques.

That is, in various embodiments, different portions of the scaled image are used to independently determine the luminous intensity values to be used with each pixel sub-component. The different image portions used to generate the luminous intensity values associated with individual pixel sub-components may be overlapping or non-overlapping image portions.

Figure 6:
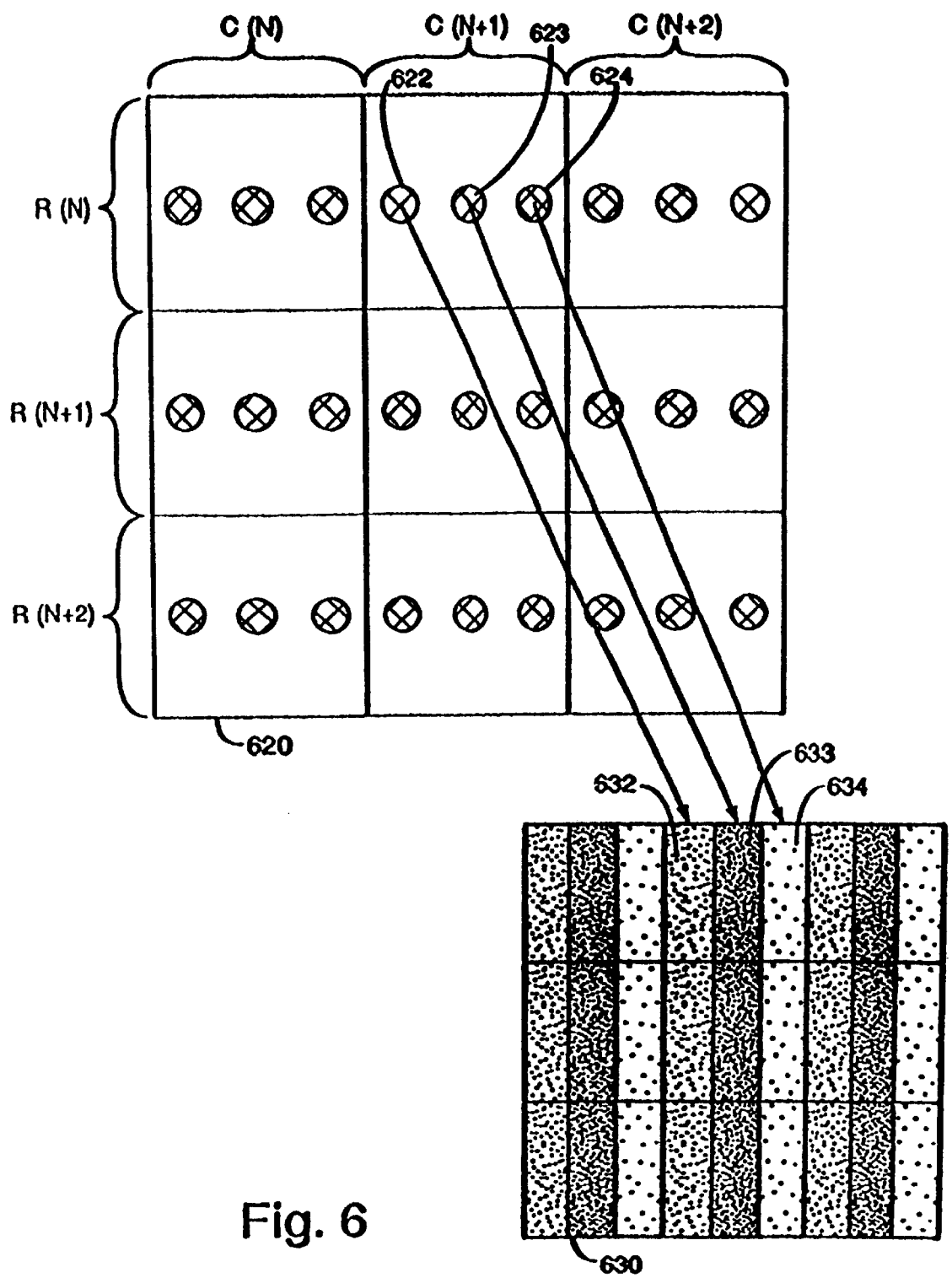
FIG. 6 illustrates image sampling performed in accordance with one exemplary embodiment of the present invention.

FIG. 6 illustrates an exemplary scan conversion operation implemented in accordance with one embodiment of the present invention. In the illustrated embodiment, separate image samples 622, 623, 624 of the image represented by the grid 620 are used to generate the red, green and blue intensity values associated with corresponding portions 632, 633, 634 of the bitmap image 630 being generated. In the FIG. 6 example, image samples for red and blue are displaced −⅓ and +⅓ of a pixel width in distance from the green sample, respectively. Thus, the displacement problem encountered with the known sampling/image representation method illustrated in FIG. 2C is avoided.

In the examples illustrated in the figures, white is used to indicate pixel sub-components which are "turned on" in the bitmap image generated by the scan conversion operation. Pixel sub-components which are not white are "turned off".

In the case of black text "on" implies that the intensity value associated with the pixel sub-component is controlled so that the pixel sub-component does not output light. Assuming a white background pixel, sub-components which are not "on" would be assigned intensity values which would cause them to output their full light output.

In the case where foreground and background colors are used "on" means that a pixel sub-component is assigned a value which would produce the specified foreground color if all three pixel sub-components were used to generate the foreground color. Pixel sub-components which are not "on" are assigned values which would produce the specified background color if all three pixel sub-components were used to generate the background color.

A first technique for determining if a pixel sub-component should be turned "on" during scaling is to determine if the center of the scaled image segment, represented by a portion of the scaling grid, being mapped into the pixel sub-component is within the scaled representation of the image to be displayed. For example, in FIG. 12A, when the center of grid segment 1020 was inside the image 1004, the pixel sub-component C1, R5 would be turned on. Another technique is to determine if 50% or more of the scaled image segment being mapped into the pixel sub-component is occupied by the image to be displayed. If it is, then the pixel sub-component is turned "on". For example, when the scaled image segment represented by grid segment 1202 is occupied at least 50% by the image 1004, then the corresponding pixel sub-component Cl, R5 is turned on. In the FIG. 12A, 12B, 13 and 14 examples which are discussed below, the first technique of determining when to turn a pixel sub-component on is employed. In other embodiments, area filtering or other types of filtering operations, e.g., weighted filtering operations, are used to determine whether to turn a pixel sub-component "on" or "off" or to a value in between. Multiple different filter weights, sometimes called tap weights, may be used to determine each one of the pixel sub-component luminous intensity values.

Figure 12A:
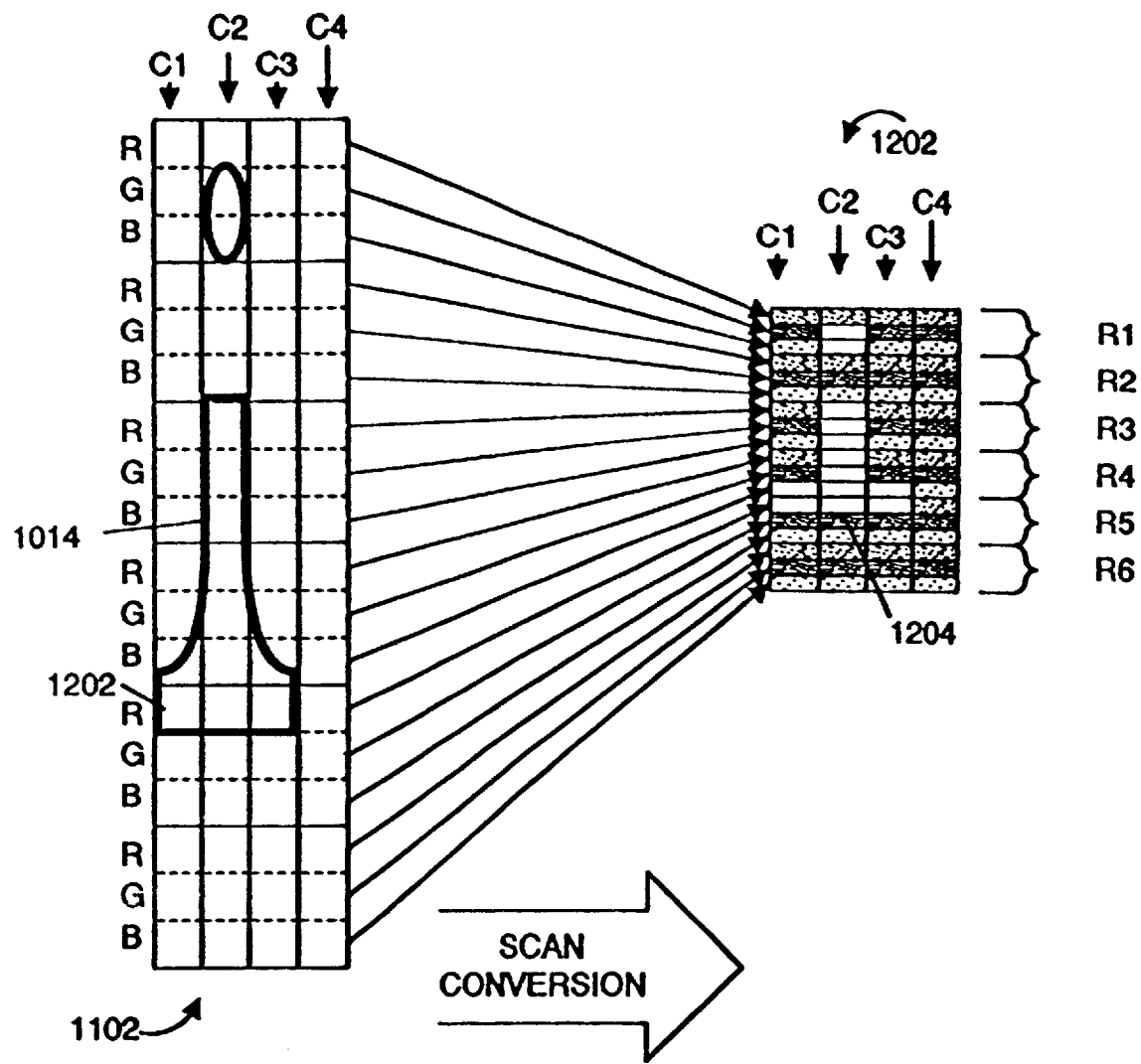
FIGS. 12A and 12B illustrate scan conversion operations performed in accordance with various exemplary embodiments of the present invention.

FIG. 12A illustrates a scan conversion operation performed on the hinted image 1004 for display on a display device with horizontal striping. The scan conversion operation results in the bitmap image 1202. Note how each pixel sub-component of bitmap image columns C1–C4 is determined from a different segment of the corresponding columns of the scaled hinted image 1004. Note also how the bitmap image 1204, comprises a ⅔ pixel height base aligned along a green/blue pixel boundary and a dot that is ⅔ of a pixel in height. Known text imaging techniques would have resulted in a less accurate image having a base a full pixel high and a dot which was a full pixel in size.

Figure 12B:
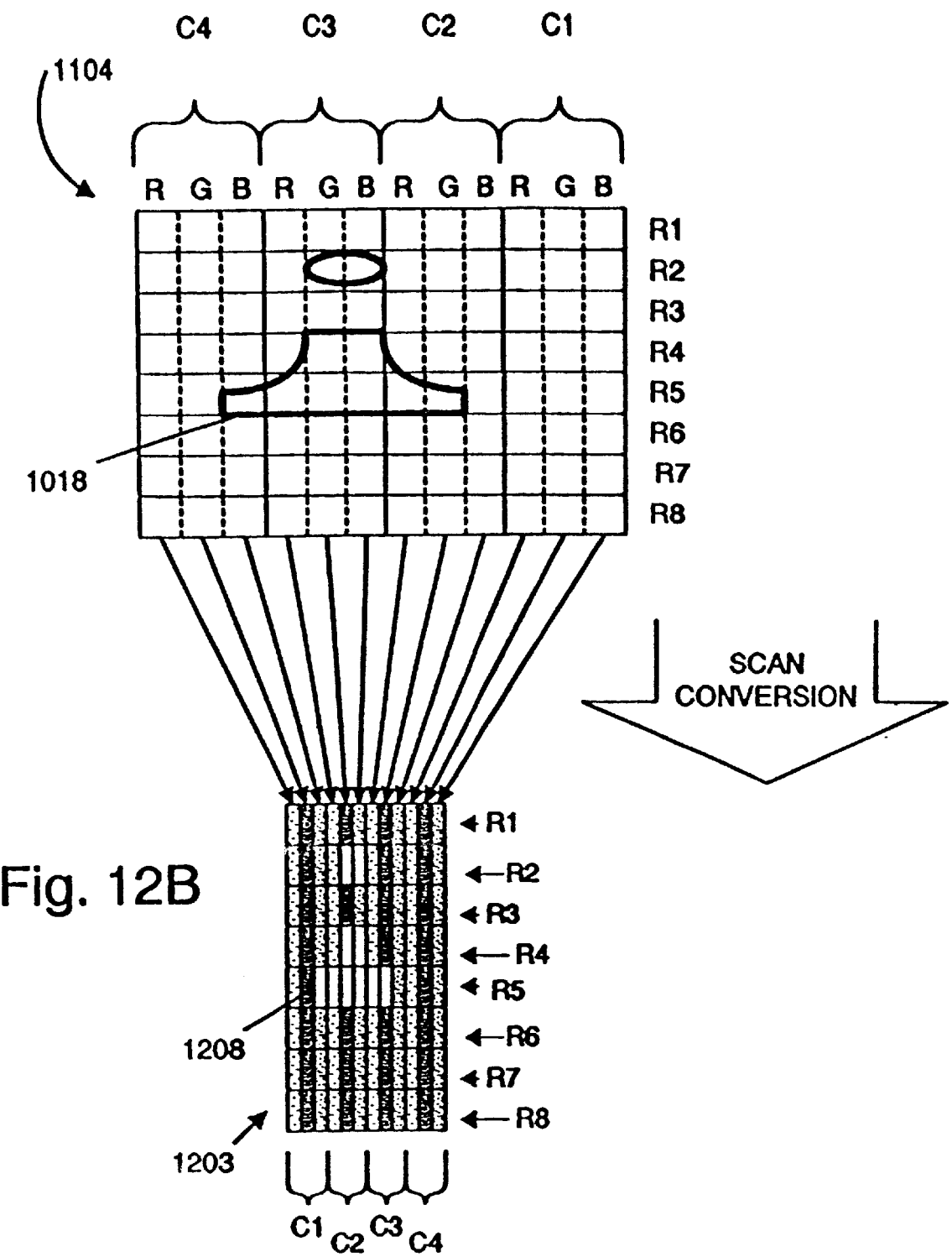

FIG. 12B illustrates a scan conversion operation performed on the hinted image 1008 for display on a display device with vertical striping. The scan conversion operation results in the bitmap image 1203. Note how each pixel sub-component of bitmap image columns C1–C4 is determined from a different segment of the corresponding columns of the scaled hinted image 1008. Note also how the bitmap image 1208, comprises a ⅔ pixel width stem with a left edge aligned along a red/green pixel boundary. Notice also that a dot that is ⅔ of a pixel in width is used. Known text imaging techniques would have resulted in a less accurate image having a stem a full pixel wide and a dot a full pixel in size.

Figure 13:
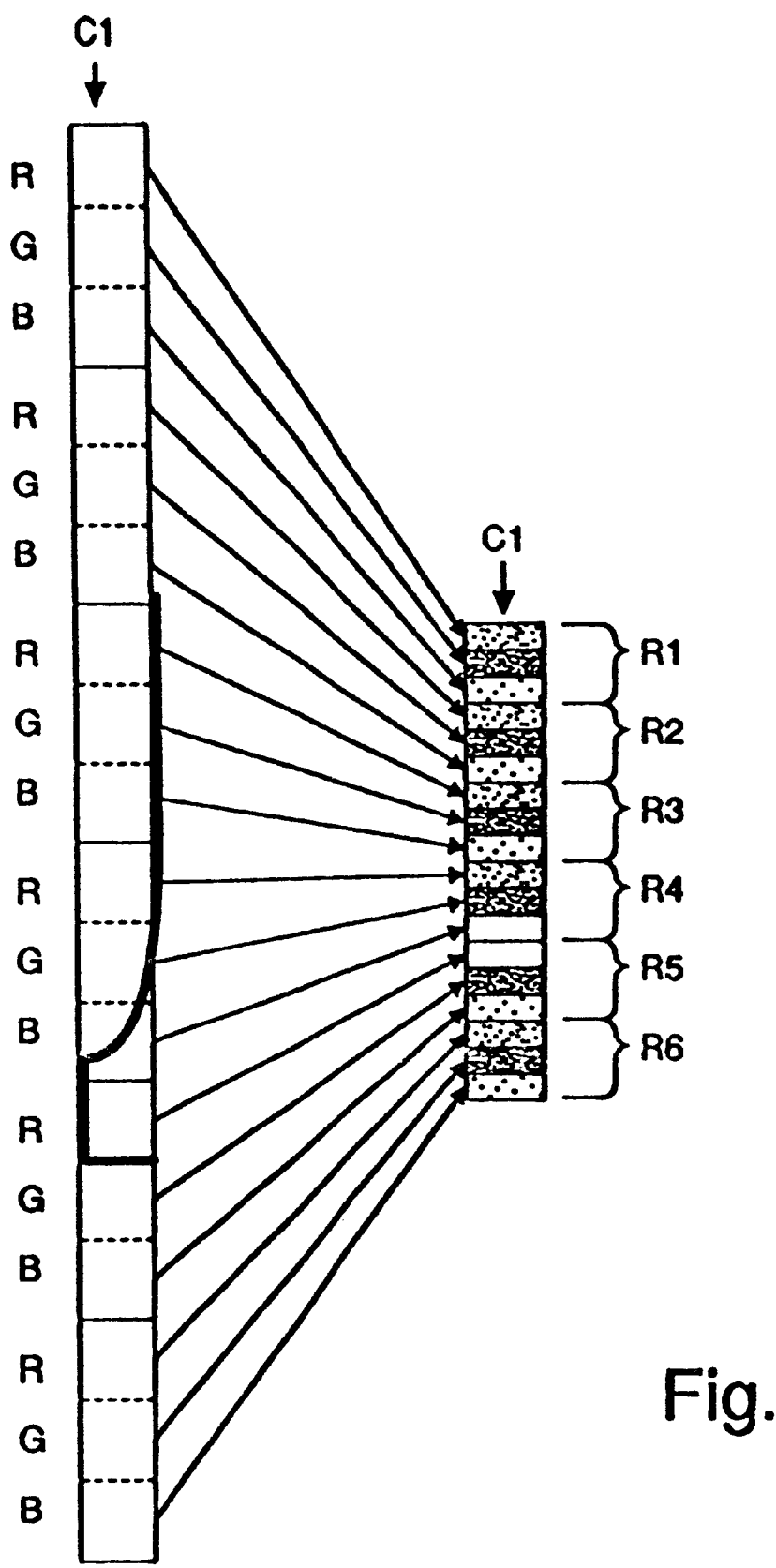
FIG. 13 illustrates the scan conversion process applied to the first column of image data illustrated in FIG. 12A in greater detail.

FIG. 13 illustrates the scan conversion processes performed to the first column of the scaled image 1004, shown in FIG. 12A, in greater detail. In the illustrated scan conversion process, one segment of the scaled image 1004 is used to control the luminous intensity value associated with each pixel sub-component. This results in each pixel sub-component being controlled by the same size portion of the scaled image 1004.

Weighting may be applied during the scan conversion operation. When weighting is applied, different size regions of the scaled image may be used to determine whether a particular pixel sub-component should be turned on or off or to a value in between (as in the case of gray scaling). Application of weighting in this manner represents an anti-aliasing filtering operation which is performed in the direction perpendicular to the direction of the RGB striping.

As discussed above, humans perceive light intensity from different color light sources at different rates. Green contributes approximately 60%, red approximately 30% and blue approximately 10% to the perceived luminance of a white pixel which results from having the red, green and blue pixel sub-components set to their maximum luminous intensity output.

In accordance with one embodiment of the present invention, weighting is used during scan conversion so that 60% of the scaled image area that is mapped into a pixel is used to determine the luminous intensity of the green pixel sub-component, a separate 30% of the scaled image area that is mapped into the same pixel is used to determine the luminous intensity of the red pixel sub-component, and a separate 10% of the scaled image area that is mapped into the same pixel is used to determine the luminous intensity of the blue pixel sub-component.

In one particular embodiment of the present invention, during the scaling operation, the image is scaled or sampled in the direction perpendicular to the striping at a rate which is ten times the rate of scaling in the direction of the striping. This is done to facilitate a weighted scan conversion operation. After hinting, the scaled image is then processed during scan conversion using a weighted scan conversion operation, e.g., of the type described above.

Figure 14:
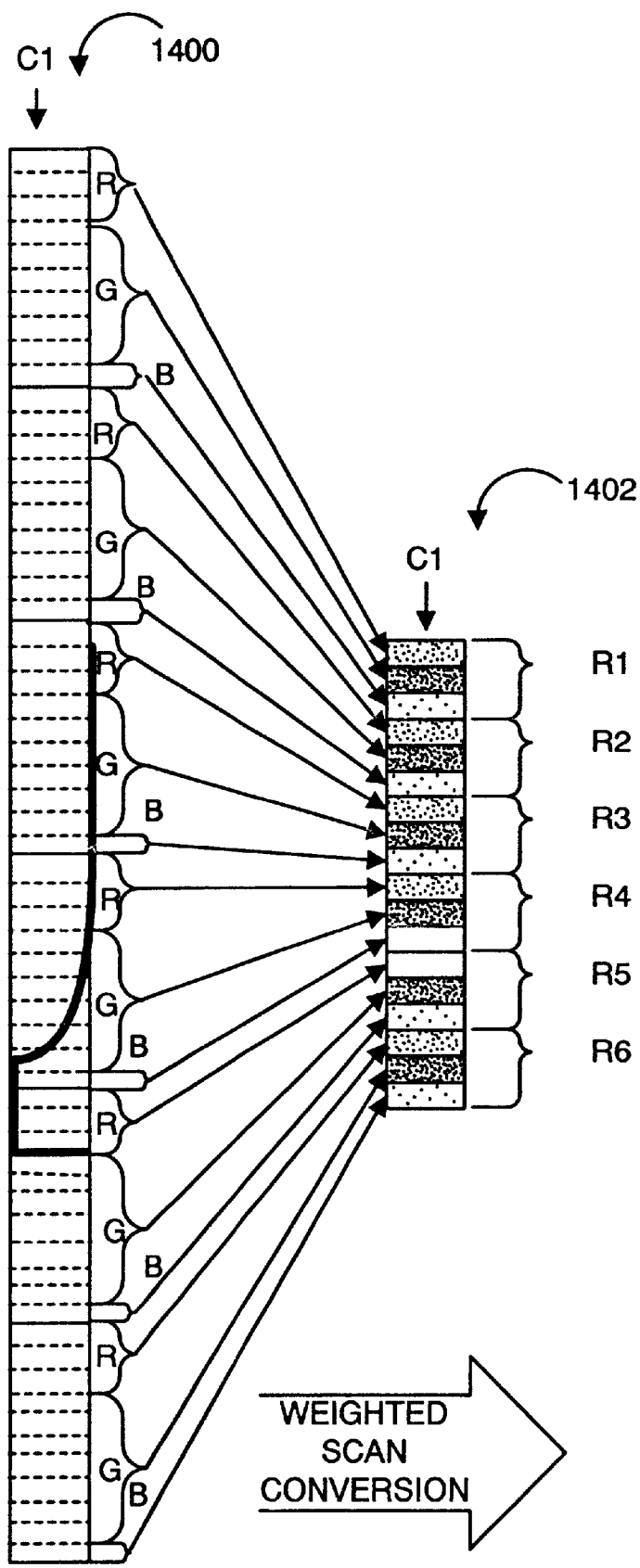
FIG. 14 illustrates a weighted scan conversion operation performed in accordance with one embodiment of the present invention.

FIG. 14 shows the use of area filtering in a non-gray scale embodiment as part of a scan conversion operation. In particular, FIG. 14 illustrates performing a weighted scan conversion operation on the first column 1400 of a scaled hinted version of the image 1002 which has been scaled by a factor of 10 in the vertical direction and a factor of one in the horizontal direction. In FIG. 14, the portion of the hinted image which corresponds to a single pixel comprises 10 segments. In accordance with the weighted scaling technique discussed above, the first three segments or each pixel area of the scaled image are used to determine the luminous intensity value of a red pixel sub-component corresponding to a pixel in the bitmap image 1402. The next six segments of each pixel area of the scaled image 1400 are used to determine the luminous intensity value of a green pixel sub-component corresponding to the same pixel in the bitmap image 1402. This leaves the last segment of each pixel area of the scaled image 1400 for use in determining the luminous intensity value of the blue pixel sub-component. In the case of one embodiment where uniform weighting of segments corresponding to a pixel sub-component is used, if half or more of the image segments are determined to be "on", then the pixel sub-component is turned "on" otherwise, the pixel sub-component corresponding to the image segments is turned "off".

In the case of gray scaling, the luminous intensity value of a pixel sub-component is determined to be a value ranging from full "on" to "off". In one exemplary case where segments are weighted evenly, the luminous intensity value of a pixel sub-component is determined as a function of the number of "on" segments relative to the total number of segments used to determine a pixel sub-component luminous intensity value.

As illustrated in FIG. 14, the center of image segments corresponding to pixel sub-components (C1, R1), (C1, R2), (C1, R3), (C1, R6) are not within the image outline and these segments are therefor all determined to be "off" in the FIG. 14 example. Similarly, the center of image segments corresponding to the red pixel sub-component of pixel (C1, R4) and to the green and blue pixel sub-components of pixel (C1, R5) are not within the image outline and these segments are therefor all determined to be "off" in the FIG. 14 example. As a result of these "off" segments, the R, G, B pixel sub-components of pixels (C1, R2), (C1, R3), (C1, R6); the R pixel sub-component of pixel (C1, R4); and the G and B pixel sub-components of pixel (C1, R5) are set to luminous intensity values corresponding to the background color being used, e.g., 256 in the exemplary case of a white background where 256 represents full "off".

The center of two out of the six image segments corresponding to the G pixel sub-component of pixel (C1, R4) are within the outline of the image. Since two segments is less that the three segments which represent 50% of the image segments corresponding to the green pixel sub-component, the G pixel sub-component of pixel (C1, R4) is also set to "off".

The center of the single image segment corresponding to the B pixel sub-component of pixel (C1, R4) and the centers of the three image segments corresponding to the R pixel sub-component of pixel (C1, R5) are all within the image outline. Accordingly, in the FIG. 14 example, the B pixel sub-component of pixel (C1, R4) and the R pixel sub-component of pixel (C1, R5) is turned "on".

Thus, the exemplary scan conversion process illustrated in FIG. 14 results in the blue pixel sub-component being turned "on" in column 1, row 4 and the red pixel sub-component being turned "on" in column 1, row 5 of the bitmap image 1402. In addition, the remaining pixel sub-components of column 1 are turned "off".

Generally, the scan conversion process of the present invention has been described in terms of turning a pixel sub-component "on" or "off".

Various embodiments of the present invention, particularly well suited for use with, e.g., graphics images, involve the use of gray scale techniques. In such embodiments, as with the embodiments discussed above, the scan conversion operation involves independently mapping portions of the scaled hinted image into corresponding pixel sub-components to form a bitmap image. However, in gray scale embodiments, the intensity value assigned to a pixel sub-component is determined as a function of the portion of the scaled image area being mapped into the pixel sub-component that is occupied by the scaled image to be displayed. For example, if, a pixel sub-component can be assigned an intensity value between 0 and 255, 0 being effectively off and 255 being full intensity, a scaled image segment (grid segment) that was 50% occupied by the image to be displayed would result in a pixel sub-component being assigned an intensity value of 128 as a result of mapping the scaled image segment into a corresponding pixel sub-component. In accordance with the present invention, the neighboring pixel sub-component of the same pixel would then have its intensity value independently determined as a function of another portion, e.g., segment or set of segments, of the scaled image.

Once the bitmap representation of the text to be displayed is generated in step 914 of FIG. 9A it may be output to the display adapter or processed further to perform color processing operations and/or color adjustments to enhance image quality.

While humans are much more sensitive to luminance edges as opposed to image color (chrominance) edges, treating the RGB pixel sub-components as independent luminous intensity elements for purposes of image rendering can result in undesired color fringing effects. If, for instance, you remove red from an RGB set, a color fringing effect of cyan, the additive of green and blue, is likely to result.

As discussed above, color artifacts may result from treating the different color pixel sub-components of a pixel as independent luminous intensity sources. Some of these color artifacts may remain after hinting. In fact, hints that improve the color of one edge of an image may degrade the color of another edge within the same image, e.g., character.

It is desirable that color artifacts which distract, e.g., attract the attention of the human eye to an undesirable degree, be detected and suppressed to a degree that they no longer distract. Since color sensitivity varies dramatically from person to person color artifacts which may be distracting to one person may not be distracting to another. Accordingly, from an implementation standpoint, it is useful to focus on suppressing or eliminating color artifacts which are likely to distract a large percentage of the population. Empirical studies conducted by various named inventors of the present application have indicated that color artifacts which are most likely to be noticed are those which 1) are bright and 2) differ substantially in hue from the foreground color, the background color, and the colors that can be created by mixing the two.

One approach to detecting pixels with color artifacts which may be distracting is to detect pixels with red, green and/or blue pixel sub-component values which do not match the luminous intensity values of the corresponding color component of a foreground colored pixel or a background colored pixel. Such a detection technique is discussed further below.

In accordance with the present invention, luminous intensity values of pixel sub-components are adjusted to reduce or eliminate distracting color distortions. This can be done by decreasing or increasing pixel sub-component luminous intensity values as necessary.

In one exemplary embodiment, adjusting the luminous intensity of pixel sub-components of distracting pixels involves (1) subtracting some luminous intensity from bright pixel sub-components and/or (2) adding some luminous intensity, e.g., the amount that was subtracted in (1), to an adjacent, different colored pixel sub-component, e.g., a neighboring pixel sub-component of the same pixel. Performing steps (1) and/or (2) in accordance with various color compensation techniques of the present invention reduces color artifacts and thus color distractions. However, such color processing may have the unwanted side effect of degrading a desired image edge. However, in most cases it has been found that it is possible to reduce color artifacts to a level where they no longer distract and still provide improved image quality as compared to the known approach where pixel sub-components are not treated as independent luminous intensity sources.

In the FIG. 9A embodiment, the bitmap generated in step 914 is supplied to the color processing/adjustment step 915. In this step, image processing is performed to reduce and/or eliminate distracting color artifacts resulting from treating the pixel sub-components as independent luminous intensity sources. Various techniques may be used to identify, reduce and/or eliminate distracting color artifacts.

In one specific embodiment, portions of an image are examined to determine how far away from the desired foreground color the bitmap image has strayed. If portions of the bitmap image have strayed more than a pre-selected amount from the desired foreground color, adjustments in the intensity values of pixel sub-components are applied until the image portions are brought within an acceptable range of an average between the foreground and background colors.

In one particular embodiment, where vertical striping is used, image edges are checked for red fringing effects. These result from the red luminous intensity value of a pixel element being much higher than the green luminous intensity value for the same pixel element. Such a condition can produce a noticeable red color fringing effect on vertical stems of characters. In the exemplary embodiment, image edge pixels are individually examined. A red/green difference intensity value is determined and compared to a threshold value which is used to determine the need for a color adjustment. If the determined red/green difference intensity exceeds the threshold value, the red and/or green values are scaled to reduce the red fringing effect. Appropriate threshold and scaling values can be empirically determined.

Cyan color fringing effects, resulting from a low red luminous intensity value compared to the green and blue luminous intensity values may be detected and compensated for by using similar thresholding and luminous intensity scaling techniques to those discussed above with regard to compensating for red fringing effects.

Figure 9B:
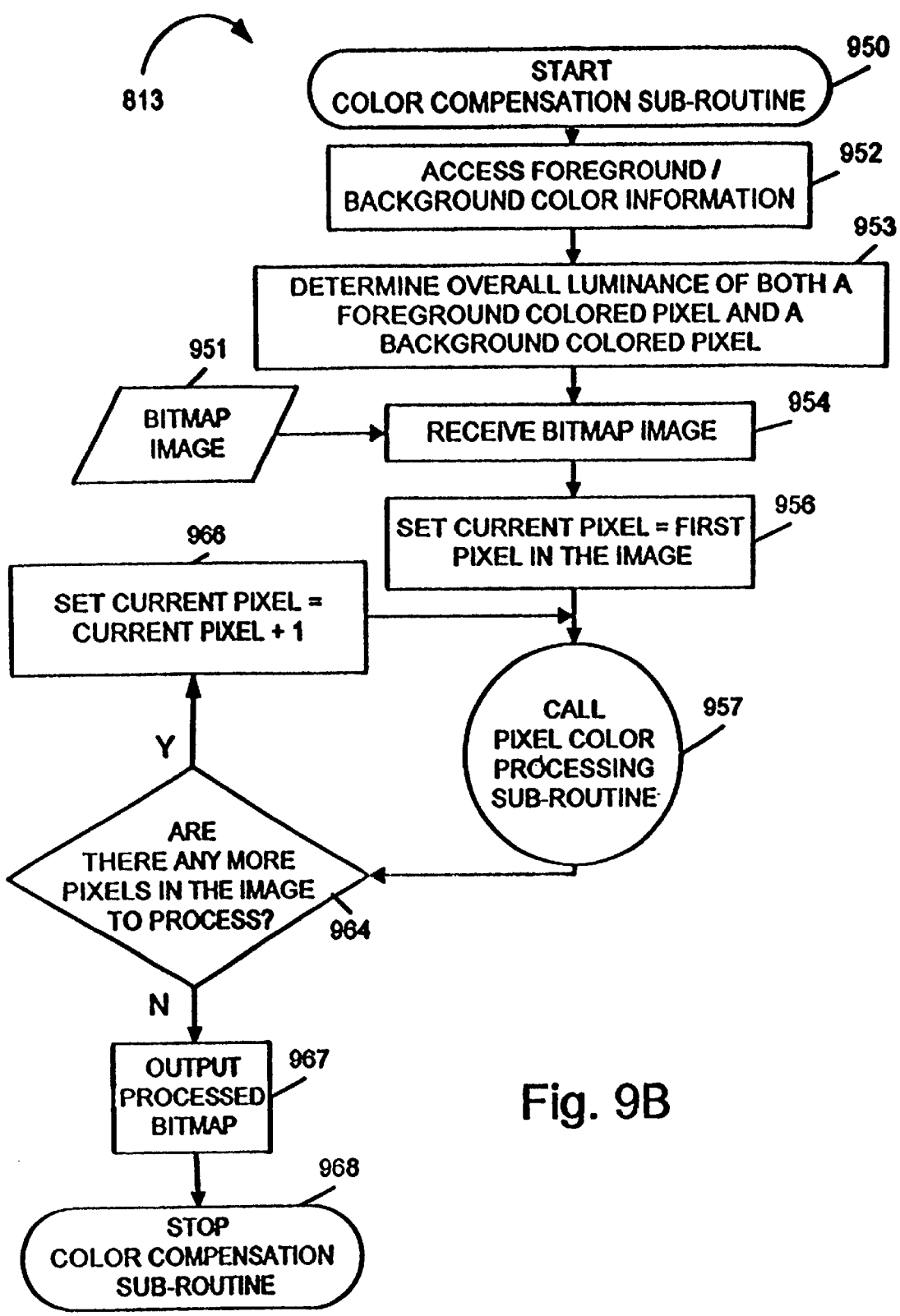
FIG. 9B illustrates an exemplary color compensation sub-routine 813 of the present invention which may be used to implement the color processing/adjustment performed in step 915 of FIG. 9A.
Figure 9C:
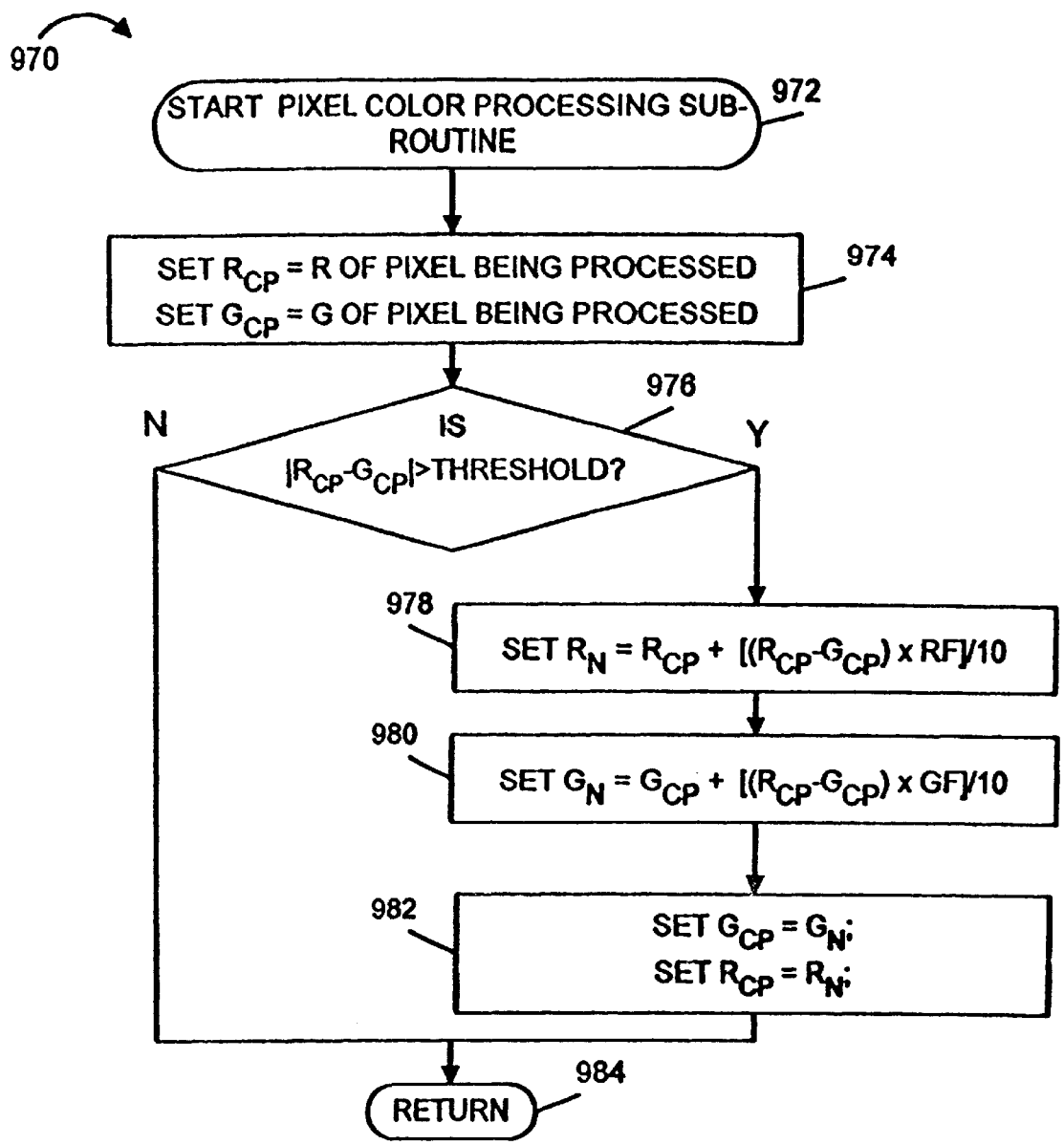
FIGS. 9C, 9D, 9E and 9F illustrate pixel color processing sub-routines implemented in accordance with exemplary embodiments of the present invention.
Figure 9D:
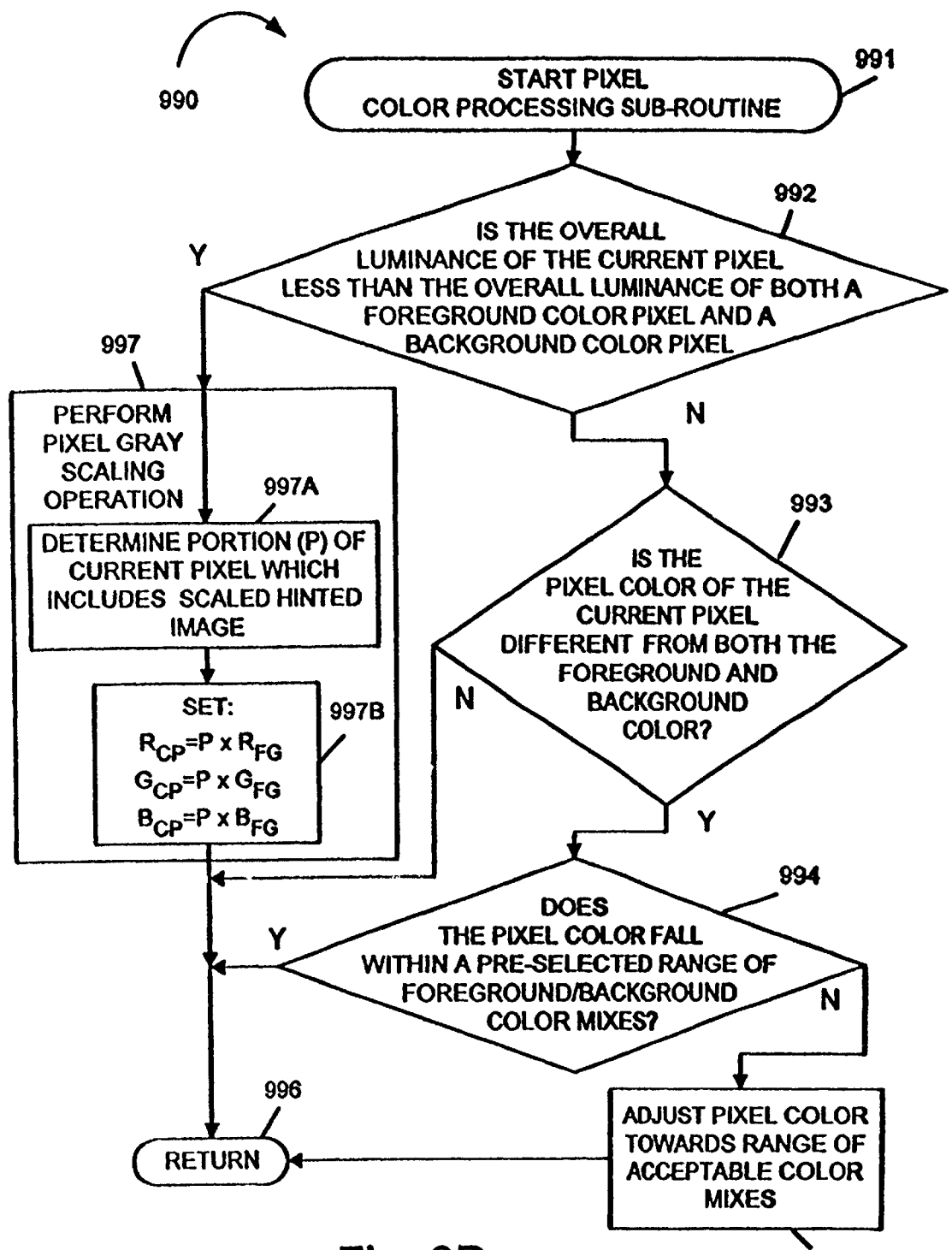
Figure 9E:
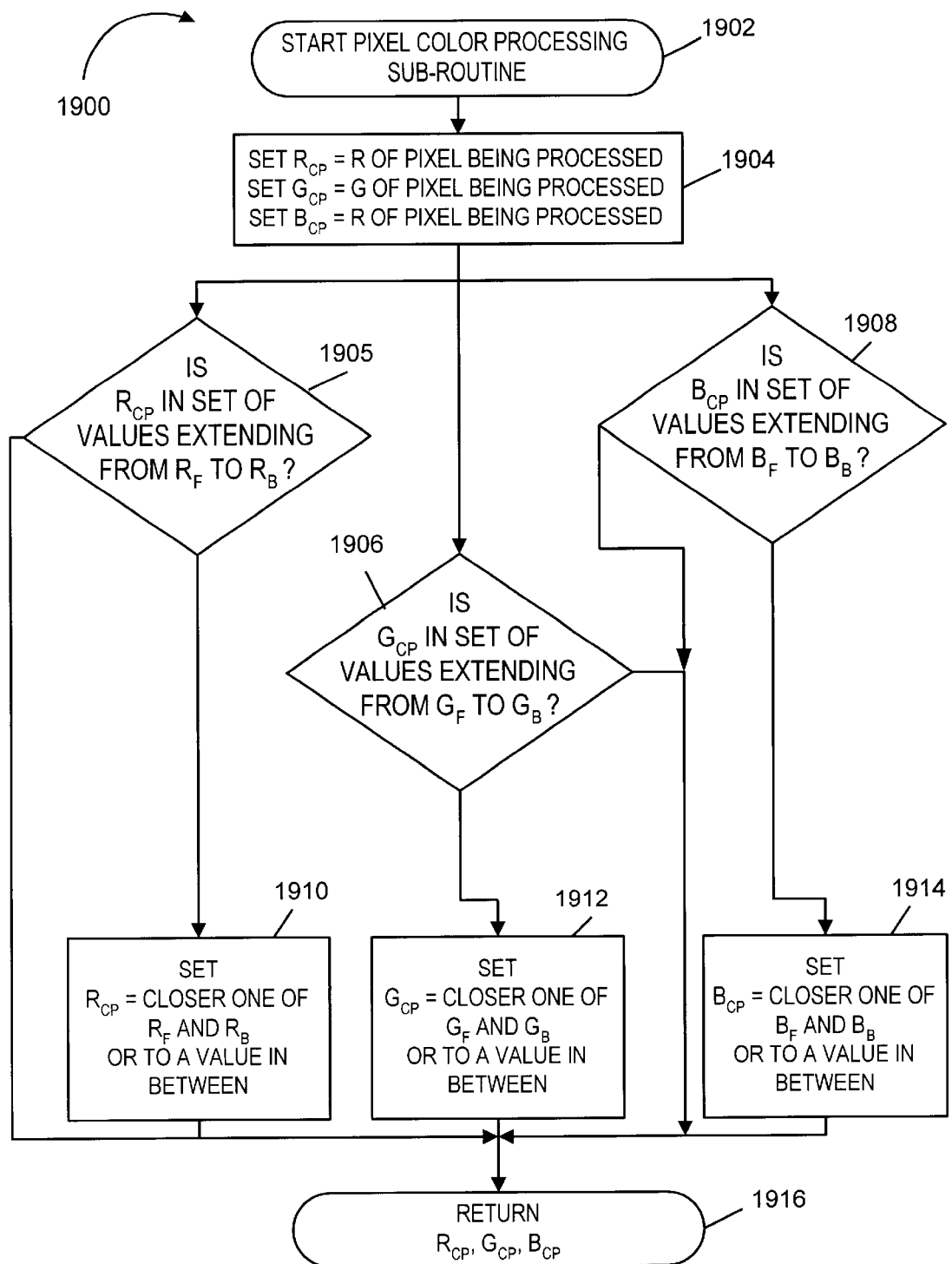

FIG. 9B illustrates an exemplary color compensation sub-routine 813 that is used, in various exemplary embodiments in conjunction with a pixel color processing sub-routine, e.g., the sub-routine 970 of FIG. 9C, the sub-routine 990 of FIG. 9D, or the sub-routine 1900 of FIG. 9E to perform the color processing/adjustment operation of step 915.

Color processing and adjustment is performed, as required, by the sub-routine 813 on a per pixel processing basis. The sub-routine 813 starts in step 950 wherein the sub-routine is executed by the CPU 521. From step 950 operation proceeds to step 952 wherein information identifying the foreground and background colors to be used, e.g., for text rendering, are accessed. This may involve accessing color information stored by the operating system in, e.g., the memory 535.

In the next step, step 953, the overall luminous intensity of both a foreground colored pixel and a background colored pixel is determined. In one embodiment, for both the foreground and background colored pixels, this involves summing the red luminance value multiplied by a weighting factor of 0.3, the green luminance value by a weighting factor of 0.6, and the blue luminance value by a weighting factor of 0.1 as follows:

overall luminous intensity of a pixel=0.3R+0.6G+0.1B, where R, G and B are the luminance intensity values of the corresponding pixel whose overall luminous intensity is being determined. The determined overall luminous intensity values of the background and the foreground colored pixels are used, at least in one embodiment, by a pixel color processing sub-routine as will be discussed below.

Step 953 is omitted or skipped, and operation proceeds directly to step 954, in embodiments where the overall luminance of both a foreground and a background colored pixel is not used by the pixel color processing sub-routine subsequently called by the color compensation sub-routine 813.

In step 954, the bitmap image 951, e.g., the bitmap image previously generated in step 914, is received for processing. The bitmap image 951 comprises a total of N pixels, i.e., pixel 1 to pixel N.

From step 954 operation proceeds to step 956 wherein the CURRENT PIXEL is set equal to the first of the N image pixels. The label CURRENT PIXEL indicates which one of the N pixels of image 951 is being processed at any given time.

Operation proceeds from step 956 to step 957 where a call is made to a pixel color processing sub-routine, e.g., either the sub-routine 970 of FIG. 9C, the sub-routine 990 of FIG. 9D, or the sub-routine 1900 of FIG. 9E.

The pixel color processing sub-routines 970, 990 and 1900 will be discussed in detail below with regard to FIGS. 9C, 9D and 9E. Generally, the called pixel color processing sub-routine is responsible for determining if the luminous intensity values of the CURRENT PIXEL should be adjusted to reduce or eliminate color artifacts and to make such adjustments as required. If the pixel color processing sub-routine determines that no changes are to be made to the luminance intensity values of the CURRENT PIXEL's pixel sub-components, operation proceeds to step 964 via a return from the called sub-routine, with the luminance intensity values of the CURRENT PIXEL's pixel sub-components unaltered. However, if the called sub-routine determines that one or more of the luminance intensity values of the CURRENT PIXEL's pixel sub-components should be changed to reduce or eliminate color distortions, e.g., artifacts, one or more of the luminance intensity values of the CURRENT PIXEL's pixel sub-components return from the sub-routine with a new, e.g., adjusted value.

The remaining steps of the color compensation sub-routine 813 serve to insure that each of the N pixels in the received bitmap image are processed by one of the pixel color processing sub-routines 970, 990, 1900.

With each return from a call to the pixel color processing sub-routine, operation proceeds to step 964 where a determination is made as to whether or not there are any more pixels in the received image to process. This may be determined by determining if the CURRENT PIXEL is the Nth pixel. If, in step 964 it is determined that additional pixels still need to be processed, operation proceeds to step 966 wherein the CURRENT PIXEL is set equal to the next one of the N pixels. From step 966 operation proceeds once again to step 957 wherein the pixel color processing sub-routine is called once again.

If, however, in step 964 it is determined that all the pixels of the received image have been processed, operation proceeds to step 967 wherein the processed bitmap is output by the color compensation sub-routine 813 to, e.g., the routine which initiated the call to the color compensation sub-routine. The processed bitmap includes the luminance intensity values which were modified by the calls to the pixel color processing sub-routine.

With the output of the processed bitmap, e.g., to the display adapter or the routine which initiated the call to the color compensation sub-routine 813, operation of the color compensation sub-routine 813 is stopped in step 968. In this manner, color compensation sub-routine 813 is halted pending the restarting of the sub-routine, e.g., to process another bitmapped image 951.

The first pixel color processing sub-routine 970 works particularly well with black and white images, e.g., black text on a white background or white text on a black background. The sub-routine 970 does not use the overall luminous intensity values of foreground and background colored pixels. Accordingly, step 953 of the color compensation sub-routine can be omitted or skipped when using the pixel color processing sub-routine 957.

White is the sum of all three pixel color components, e.g., red, green and blue. Bright color artifacts, in a black on white embodiment, are those colors which result from summing the full light output of any two of the three pixel color components, e.g., yellow is the sum of red and green, magenta is the sum of red and blue, and cyan is the sum of green and blue. Because the blue sub-pixel has only ⅓ the potential luminous intensity of the red, and only ⅙$^{th}$ that of the green pixel sub-components, a blue pixel sub-component has little effect in trading luminous intensity with a bright red or green pixel sub-component. For this reason, in the exemplary 9C embodiment, potential artifacts resulting from blue various intensity values are ignored.

The processing implemented in sub-routine 970 serves to identify pixels which are likely to distract as those for which one of the red or green pixel sub-components are bright and the other is not. Suppression of the color artifact is achieved in the sub-routine 970 by decreasing the luminance intensity value of the brighter of the red or green pixel sub-components and increasing the luminance intensity value of the dimmer of the red or green pixel sub-components.

The processing performed on the R, G and B luminous intensity values of a CURRENT PIXEL, performed by sub-routine 970, may be expressed in pseudo code as follows:

If $|R_{CP}-G_{CP}|$>THRESHOLD THEN:
  SET $R_N=R_{CP}+[(R_{CP}-G_{CP})\times RF]/10$
    $G_N=G_{CP}+[(R_{CP}-G_{CP})\times GF]/10$ where $R_{CP}$=luminance intensity value of the CURRENT PIXEL's red pixel sub-component which can be any integer value in the range of 0 to 255;

$G_{CP}$=luminance intensity value of the CURRENT PIXEL's green pixel sub-component which can be any integer value in the range of 0 to 255;

$R_N$=luminance intensity value of the CURRENT PIXEL's red pixel sub-component which can be any integer value in the range of 0 to 255;

$G_N$=luminance intensity value of the CURRENT PIXEL's green pixel sub-component which can be any integer value in the range of 0 to 255;

RFis a red factor, e.g., 4;

GFis a green factor, e.g., 6; and

THRESHOLD is an empirically determined threshold value, e.g., 50.

Referring now to FIG. 9C it can be seen that the pixel color processing sub-routine 970 begins with start step 974 wherein the routine is called for processing the CURRENT PIXEL's red and green luminance intensity values which can be any integer value in the range of 0 to 255, respectively. Next, in step 976, a determination is made as to whether $|R_{CP}-G_{CP}|$ is greater than a predetermined threshold value, THRESHOLD, used to determine the presence of a distracting color artifact.

If the threshold value is not exceeded in step 976, indicating that a distracting color artifact probably does not exist, processing returns, via RETURN step 984, to the place from which the sub-routine 970 was called without alteration of the CURRENT PIXEL's luminance values.

If, however, it is determined that the value $|R_{CP}-G_{CP}|$ exceeds the value THRESHOLD, indicating the probable presence of a distracting color artifact, operation proceeds from step 976 to step 978. In step 978 a new red pixel sub-component luminance intensity value $R_N$ is generated as a function of the original red and green intensity values. In particular, $R_N$ is set equal to $R_{CP}+[(R_{CP}-G_{CP})\times RF/10]$. Division by ten is performed to avoid the need to use a floating point value for $R_F$ which would then necessitate the use of floating point arithmetic.

Next, in step 980, a new green pixel sub-component luminance intensity value $G_N$ is generated as a function of the original red and green intensity values. In particular, $G_N$ is set equal to $G_{CP}+[(R_{CP}-G_{CP})\times RF/10]$. As in the case of generation of the value $R_N$, division by ten is performed to avoid the need to use a floating point value for $R_F$ which would require floating point arithmetic to be performed.

While steps 978 and 980 are shown in series, it is to be understood that they could be performed in parallel. After generation of the new values $R_N$ and $G_N$, the corresponding red and green luminance intensity values of the current pixel are replaced with the newly generated values. This occurs in step 982. With the CURRENT PIXEL's red and green luminance intensity values updated in step 982, color correction processing with regard to the current pixel is complete and processing returns, via RETURN step 984, to the place from which the sub-routine 970 was called.

Operation of the second exemplary pixel color processing sub-routine 990 will now be described in regard to FIG. 9D. The FIG. 9D embodiment represents a non-linear filtering operation. The sub-routine 990 is suitable for processing pixels of images which are to be displayed using arbitrary, e.g., user selected, foreground and background colors.

With arbitrary foreground and background colors, the identification and suppression of color artifacts resulting from treating individual pixel sub-components as independent luminous intensity sources becomes more difficult than the black and white case discussed above. Experiments have shown that the more saturated the foreground or background color, the less likely it is that a color artifact will be distracting. This is because saturation is actually achieved by suppressing the brightness of the complementary color components. This limited brightness of the complementary color components not only avoids the creation of bright distracting color artifacts, but makes the suppressed pixel sub-component's unsuitable for creating an edge with a high luminous intensity on the suppressed pixel sub-component's side. The net result is that for highly-saturated colors, many of the possible edge containing pixels gain no improvement in resolution from treating pixel sub-components as independent luminous intensity sources in accordance with the present invention. An example of a foreground/background color combination which can be problematic in the above described manner is red text on a blue background.

On a display that places red pixel sub-components on the left and blue pixel sub-components on the right, a pixel rendered to display an edge with blue on the left and red on the right would be entirely black. Such a pixel would not have a color artifact, but also would make no contribution to the resolution of the image. In fact, a row of such pixels could even create the appearance of a black line, an artifact of the sub-pixel intensity control technique of the present invention. From an image quality standpoint, it is desirable that such artifacts be identified and eliminated, e.g., by utilizing traditional, whole pixel rendering techniques such as gray scaling with regard to pixels that would otherwise produce such artifacts.

The color processing sub-routine 990 includes steps directed to identifying pixels which produce artifacts of the above described type which would benefit from the application of gray scaling on a whole pixel level as opposed to the generation independent luminance values for each of the pixel sub-components. It also includes steps which involve the application of gray scaling to determine the luminance values for such pixels. In one embodiment, the gray scaling reversion is applied whenever the overall luminance intensity of the pixel being processed is less than the overall luminance intensity of both the foreground and background color. The use of gray scaling under certain limited circumstances makes the overall filtering process implemented by sub-routine 990 non-linear.

In addition to determining when gray scaling would enhance pixel appearance, the color processing sub-routine 990 is directed to identify distracting color artifacts and performing processing to reduce or eliminate such artifacts.

The pixel color processing sub-routine 990 begins in the start step 991 and proceeds from there to step 992 where a determination is made as to whether or not gray scaling, applied on a whole pixel basis, should be used to determine the luminance values of the CURRENT PIXEL. In step 992 a determination is made as to whether or not the overall luminance of the CURRENT PIXEL is less than the overall luminance of both a foreground color pixel and a background color pixel. If it is determined that the overall luminance value is less then that of a foreground and a background color pixel, than gray scaling will probably provide superior luminance values than those determined by the pixel sub-component method of the present invention. In such a case, operation proceeds from step 992 to step 997 wherein a pixel gray scaling operation is performed. The gray scaling operation involves two sub-steps, 997A and 997B. In step 997A the portion (P) of the current pixel which includes the scaled hinted image is determined. In step 997B, new red, green and blue luminance intensity values are determined for the current pixel by multiplying the fractional value P times the corresponding R, G and B luminance intensity values of the foreground color. Once the updated luminance intensity values for the CURRENT PIXEL are generated in step 997, processing returns, via RETURN step 984, to the place from which the sub-routine 970 was called.

If in step 992 it was determined that gray scaling was not likely to improve the quality of the CURRENT PIXEL, operation proceeds to step 993. In step 993, a determination is made as to whether the color of the CURRENT PIXEL is different from both the foreground and background colors. This determination may be made by comparing the R, G, and B luminance intensity values of the CURRENT PIXEL to those of a foreground color pixel and a background color pixel. If in step 993 it is determined the color of the current pixel matches one of the foreground and background color pixels, no color artifact is present and processing returns, via RETURN step 984, to the place from which the sub-routine 970 was called with the CURRENT PIXEL's luminance intensity values being left unaltered.

If, however, in step 993 it is determined that the color of the current pixel differs from the foreground and background colors, operation proceeds to step 994. In step 994 a determination is made as to whether or not the color of the CURRENT PIXEL falls within a pre-selected acceptable range of colors corresponding to foreground/background color mixes. If the color of the current pixel falls within the pre-selected range, processing returns, via RETURN step 984, to the place from which the sub-routine 970 was called with the CURRENT PIXEL's luminance intensity values being left unaltered.

However, if in step 994 it is determined that the color of the CURRENT PIXEL falls outside the pre-selected range of acceptable colors, indicating the presence of a distracting color artifact, operation proceeds to step 995 wherein the color of the CURRENT PIXEL is adjusted towards the range of acceptable colors. This may involve modifying one or more of the R, G, B luminance intensity values associated with the CURRENT PIXEL, e.g., by adding or subtracting from the existing values to move the individual value closer to those found in the pre-selected range of acceptable colors. Thus, at the end of step 995, the color of the CURRENT PIXEL is closer to being within, or falls within, the pre-selected acceptable range of colors corresponding to a mix of foreground and background colors. Once the luminance intensity values of the CURRENT PIXEL are updated in step 995, processing returns, via RETURN step 984, to the place from which the sub-routine 970 was called.

In the above described manner, the luminous intensity values of pixels representing a bitmapped image may be processed and adjusted, on a pixel by pixel basis, to reduce or eliminate color distortions introduced into an image as the result of treating different color pixel sub-components as independent luminance sources.

Various techniques for detecting and compensating for color errors in pixels have been described above in regard to FIGS. 9C and 9D. Another approach to detecting for potentially distracting color errors involves identifying pixels which include R, G, or B luminous intensity values which fall outside the range of R, G, B luminous intensity values which exist between a utilized foreground color and a utilized background color. Luminous intensity values falling outside the foreground/background luminous intensity values can be clamped to the nearest corresponding foreground or background luminous intensity value to reduce detected color errors. In such an embodiment, each pixel's individual R, G, and B luminous intensity values can be processed separately for color error detection/correction purposes.

In particular, in such embodiments a pixel's R pixel sub-component luminous intensity value is compared to a range of pixel sub-component luminous intensity values extending between and including, the red foreground luminous intensity value $R_F$ and the red background luminous intensity value $R_B$. If the R pixel sub-component luminous intensity value falls outside the range of permitted values to which it is compared, it is replaced with a new luminous intensity value equal to the closer of the red foreground and red background pixel sub-component luminous intensity values ($R_F$ and $R_B$).

Color error detection and correction is performed on a pixel's green and blue pixel sub-component luminous intensity values in generally the same manner as the red pixel sub-component luminous intensity values. However, when processing a green pixel sub-component luminous intensity value the green foreground and green background luminous intensity values are used in place of the red foreground and red background luminous intensity values. Similarly when processing a blue pixel sub-component luminous intensity value the blue foreground and blue background luminous intensity values are used in place of the red foreground and red background luminous intensity values.

Processing of the R, G, and B pixel sub-component luminous intensity values in the above described manner can be performed as three separate independent operations. Accordingly, the R, G, B pixel sub-components can be processed either in parallel or sequentially.

FIG. 9E illustrates a pixel color processing sub-routine 1900 for detecting color errors in pixels and for compensating or reducing for detected errors by setting one or more pixel sub-component luminous intensity values to match a pixel sub-component luminous intensity value associated with a corresponding R, G, or B pixel sub-component of a foreground or background colored pixel.

As illustrated the pixel color processing sub-routine 1900 begins in step 1902 with the routine being executed in response to a call from, e.g., step 957 of the color compensation sub-routine 813.

From step 1902, operation proceeds to step 1904 wherein sub-routine variables $R_{CP}$, $G_{CP}$ and $B_{CP}$ are set equal to the R, G, and B pixel sub-component luminous intensity values, respectively, of the current pixel being processed. From step 1904, operation proceeds to steps 1905, 1906 and 1908 which represent the start of red, green and blue pixel sub-component luminous intensity value processing paths, respectively.

In step 1905, a determination is made as to whether or not $R_{CP}$ is within an acceptable range of values which extends from $R_F$ to $R_B$, and includes $R_F$ and $R_B$, where $R_F$ is the luminous intensity value of a red foreground pixel sub-component and $R_B$ is the luminous intensity value of a red background pixel sub-component. If in step 1905 it is determined that $R_{CP}$ is within the acceptable range of values, operation proceeds to step 916 with the value $R_{CP}$ being left unaltered. If, however, in step 1905 it is determined that the value $R_{CP}$ is outside the acceptable range of values, operation proceeds to step 1910.

In step 1910, the value $R_{CP}$ is set, e.g., clamped to, the one of the $R_F$ or $R_B$ values which is closest to the $R_{CP}$ value being processed or to a value in between $R_F$ and $R_B$. In this manner, the $R_{CP}$ value is modified to reduce, compensate, or eliminate the red color error detected in step 1905. From step 1910, operation proceeds to step 1916.

In step 1906, a determination is made as to whether or not $G_{CP}$ is within an acceptable range of values which extends from $G_F$ to $G_B$, and includes $G_F$ and $G_B$, where $G_F$ is the luminous intensity value of a green foreground pixel sub-component and $G_B$ is the luminous intensity value of a green background pixel sub-component. If in step 1905 it is determined that $G_{CP}$ is within the acceptable range of values, operation proceeds to step 916 with the value $G_{CP}$ being left unaltered. If, however, in step 1906 it is determined that the value $G_{CP}$ is outside the acceptable range of values, operation proceeds to step 1912.

In step 1912, the value $G_{CP}$ is set, e.g., clamped to, the one of the $G_F$ or $G_B$ values which is closest to the $G_{CP}$ value being processed or to a value in between $G_F$ and $G_B$. In this manner, the $G_{CP}$ value is modified to reduce, compensate, or eliminate the green color error detected in step 1906. From step 1912, operation proceeds to step 1916.

In step 1908, a determination is made as to whether or not $B_{CP}$ is within an acceptable range of values which extends from $B_F$ to $B_B$, and includes $B_F$ and $B_B$, where $B_F$ is the luminous intensity value of a blue foreground pixel sub-component and $B_B$ is the luminous intensity value of a blue background pixel sub-component. If in step 1905 it is determined that $B_{CP}$ is within the acceptable range of values, operation proceeds to step 916 with the value $B_{CP}$ being left unaltered. If, however, in step 1908 it is determined that the value $B_{CP}$ is outside the acceptable range of values, operation proceeds to step 1914.

In step 1914, the value $B_{CP}$ is set, e.g., clamped to, the one of the $B_F$ or $B_B$ values which is closest to the $B_{CP}$ value being processed or to a value in between $B_F$ and $B_B$. In this manner, the $B_{CP}$ value is modified to reduce, compensate, or eliminate the blue color error detected in step 1908. From step 1914, operation proceeds to step 1916.

In step 1916, the $R_{CP}$, $G_{CP}$ and $B_{CP}$ values which result from the pixel color processing sub-routine 1900 processing the input pixel sub-component luminous intensity values is returned to the color compensation sub-routine 950 and operation of the sub-routine 1900 is stopped until it is called again to process another set of pixel sub-component luminous intensity values.

Pseudo code for implementing color error detection and luminous intensity correction operations consistent with the technique illustrated in FIG. 9E is set forth below. Note that in the following pseudo code, the detection of color errors and the processing to reduce such errors are broken up into multiple steps in order to achieve implementation efficiency.

```
} //Begin pixel color processing sub-routine
  { //Begin R_CP processing
      if(R_F<R_B) //Loop for when R_F < R_B
      {
          if (R_CP<R_F)
              R_CP=R_F;
          else if(R_CP>R_B)
              R_CP=R_B;
      }
      else    //Loop for when R_F > R_B
          if R_CP<R_B
              R_CP = R_B;
          else if (R_CP> R_F)
              R_CP = R_F;
      }
  } //end R_CP processing loop
  { //Begin G_CP processing
      if(G_F<G_B) //Loop for when G_F < G_B
      {
          if (G_CP<G_F)
              G_CP=G_F;
          else if (G_CP>G_B)
              G_CP=G_B;
      }
      else    //Loop for when G_F > G_B
      {
          if G_CP<G_B
              G_CP = G_B;
          else if (G_CP>G_F)
              G_CP = G_F;
      }
  } //end G_CP processing loop
  { //Begin B_CP processing
      if(B_F<B_B) //Loop for when B_F < B_B
```

-continued

```
{
    if (B_CP<B_F)
        B_CP=B_F;
    else if(B_CP>B_B)
        B_CP=B_B;
}
else    //Loop for when B_F > B_B
{
    if B_CP<B_B
        B_CP = B_B;
    else if (B_CP> B_F)
        B_CP = B_F;
}
} //end B_CP processing loop
Return R_CP, G_CP, B_CP
} //End pixel color processing sub-routine
```

As an example of the processing performed by the pixel color processing sub-routine 1900 or the preceding pseudo code consider the following example foreground pixel sub-component luminous intensity values, background pixel sub-component luminous intensity values, and current pixel pixel sub-component luminous intensity values:

| | | | |
|---|---|---|---|
| background colored pixel: | $R_B = 120$, | $G_B = 255$, | $B_B = 70$; |
| foreground colored pixel: | $R_F = 0$, | $G_F = 0$, | $B_B = 125$; |
| current pixel: | $R_{CP} = 140$, | $G_{CP} = 255$, | $B_{CP} = 40$. |

Using the pixel color processing sub-routine 1900 to process the pixel sub-component luminous intensity values of the current pixel set forth above, would produce an output, e.g., updated set of current pixel values, as follows:

updated current pixel: $R_{CP}=120, G_{CP}=255, B_{CP}=70$.

The exemplary red pixel sub-component luminous intensity value ($R_{CP}=140$) of the current pixel being processed, is outside the range of luminous intensity values extending from ($R_F$) 0 to ($R_B$) 120. Accordingly, it is determined to represent a color error upon which a color compensation or correction operation should be performed. In accordance with the FIG. 9E embodiment, the detected color error is reduced by setting $R_{CP}$ equal to the closer of the foreground and background red pixel sub-component luminous intensity values, i.e., $R_{CP}$ is set to the value 120 which corresponds to $R_B$.

The exemplary green pixel sub-component luminous intensity value ($G_{CP}=255$) of the current pixel being processed, is within the range of luminous intensity values extending from ($G_F$) 0 to ($R_B$) 255. Accordingly, no color compensation is performed by the routine 1900 on this luminous intensity value and the value $G_{CP}$ is left unaltered.

The exemplary blue pixel sub-component luminous intensity value ($B_{CP}=40$) of the current pixel being processed, is outside the range of luminous intensity values extending from ($B_F$) 125 to ($B_B$) 70. Accordingly, it is determined to represent a color error upon which a color compensation or correction operation should be performed. In accordance with the FIG. 9E embodiment, the detected color error is reduced by setting $B_{CP}$ equal to the closer of the foreground and background blue pixel sub-component luminous intensity values, i.e., $B_{CP}$ is set to the value 70 which corresponds to $B_F$.

Figure 9F:
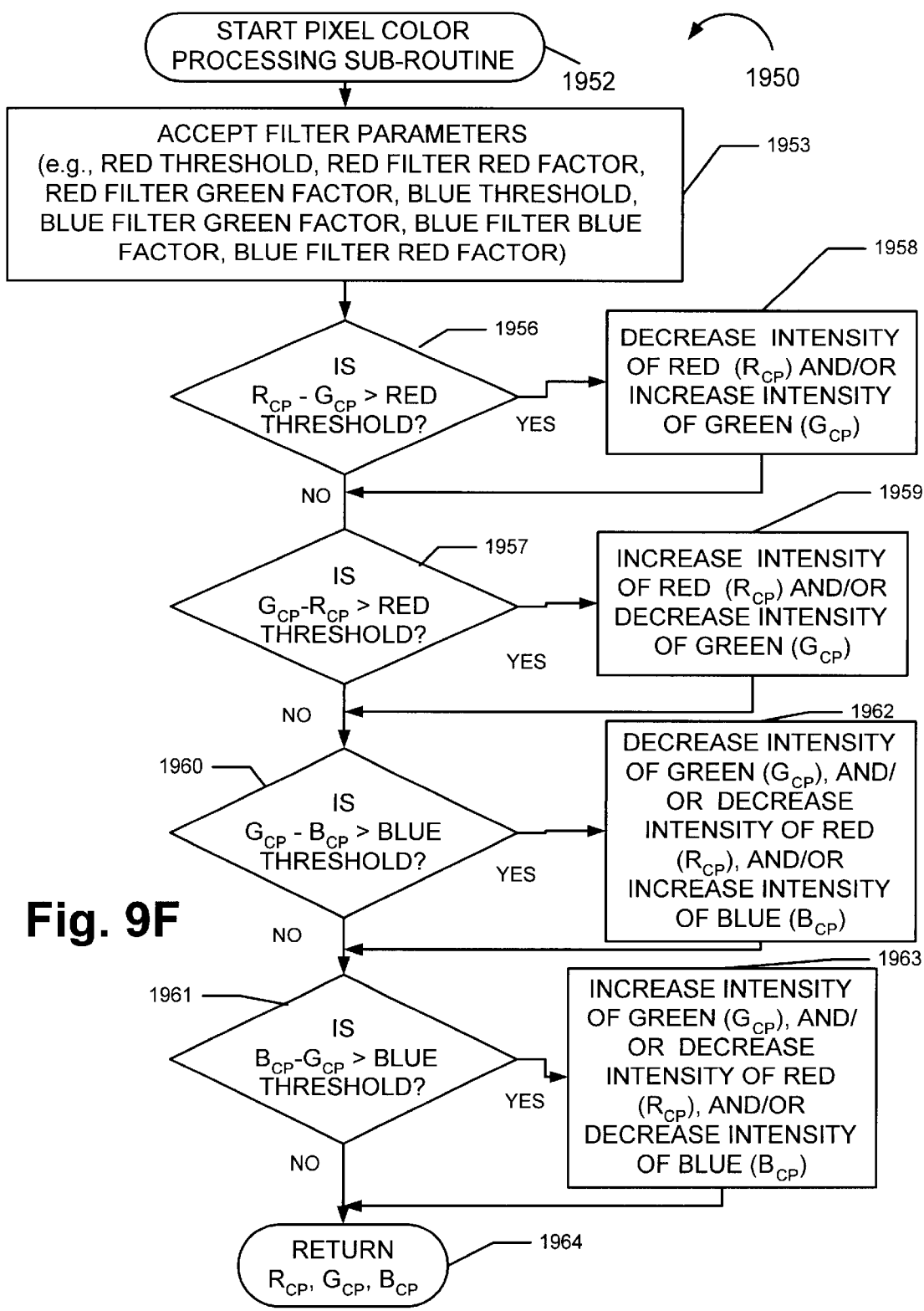

FIG. 9F is a flow diagram of another exemplary pixel color processing sub-routine 1950 of the present invention. The sub-routine 1950 begins in step 1952 and proceeds to step 1953 wherein filter parameters are loaded into memory 522. These filter parameters may be provided, e.g., by the operating system or the application 538. Once the filter parameters are loaded, step 1953 may be skipped in future iterations of the sub-routine 1950 until such time as the parameters are changed. In sub-routine 1950, two (2) filters—namely a red filter and a blue filter are provided. In the exemplary embodiment, the red filter uses a red threshold, a red factor, and a green factor. The blue filter uses a blue threshold, a green factor, a blue factor, and a red factor. The red and blue filters may be implemented in stages.

In decision step 1956, if it is determined whether the difference between the red and green pixel sub-component luminous intensity values ($R_{CP}-G_{CP}$) is greater than the red filter threshold value, operation proceeds to step 1958. In step 1958, the red pixel sub-component luminous intensity value ($R_{CP}$) is decreased and/or the green pixel sub-component luminous intensity value is increased. This step may be carried out in accordance with the following expressions:

if ($R_{CP}-G_{CP}$)>Red Filter Threshold, then $R_{CP}'=R_{CP}-((R_{CP}-G_{CP})*$Red Filter Red Factor$)/10$ $G_{CP}'=G_{CP}+((R_{CP}-G_{CP})*$Red Filter Green Factor$)/10$ Set $R_{CP}=R_{CP}'$, Set $G_{CP}=G_{CP}'$ where $R_{CP}'$ is the updated red pixel sub-component luminous intensity value, and $G_{CP}'$ is the updated green pixel sub-component luminous intensity value.

Processing proceeds from step 1958 to decision step 1957. Operation proceeds directly from step 1956 to step 1957 if it is determined in step 1956 that the difference between the red and green pixel sub-component luminous intensity values ($R_{CP}-G_{CP}$) is less than or equal to the red filter threshold value.

In decision step 1957, if it is determined that the difference between the green and red pixel sub-component luminous intensity values ($G_{CP}-R_{CP}$) is greater than the red filter threshold value operation proceeds to step 1959. In step 1959 the red pixel sub-component luminous intensity value ($R_{CP}$) is increased and/or the green pixel sub-component luminous intensity value is decreased.

Steps 1956, 1958, 1957 and 1959 in combination comprise a red filter which reduces the difference between the red and green pixel sub-component values when the magnitude of the difference between these values exceeds the red threshold.

Processing proceeds from step 1959 to decision step 1960. Operation proceeds directly from step 1957 to step 1960 if it is determined in step 1957 that the difference between the green and red pixel sub-component luminous intensity values ($G_{CP}-R_{CP}$) is less than or equal to the red filter threshold value.

In decision step 1960, if it is determined that the difference between the green and blue pixel sub-component luminous intensity values ($G_{CP}-B_{CP}$) is greater than the blue filter threshold value, operation proceeds to step 1962. In step 1962 the green pixel sub-component luminous intensity value ($G_{CP}$) is decreased, and/or the blue pixel sub-component luminous intensity value ($B_{CP}$) is increased, and/or the red pixel sub-component luminous intensity value ($R_{CP}$) is decreased. This step may be carried out in accordance with the following expressions:

if (GCP−BCP)>Blue Filter Threshold, then $G_{CP}' = G_{CP} - ((G_{CP} - B_{CP}) * \text{Blue Filter Green Factor})/10$ $B_{CP}' = B_{CP} + ((G_{CP} - B_{CP}) * \text{Blue Filter Blue Factor})/10$ $R_{CP}' = R_{CP} - ((G_{CP} - B_{CP}) * \text{Blue Filter Red Factor})/10$

SET $R_{CP} = R_{CP}'$

SET $G_{CP} = G_{CP}'$

SET $B_{CP} = B_{CP}'$ where $R_{CP}'$ is the modified red pixel sub-component luminous intensity value, $B_{CP}'$ is the modified blue pixel sub-component luminous intensity value and $R_{CP}'$ is the modified red pixel sub-component luminous intensity value.

Processing proceeds from step 1962 to decision step 1961. Operation proceeds directly from step 1960 to step 1961 if it is determined in step 1960 that the difference between the blue and green pixel sub-component luminous intensity values ($G_{CP} - B_{CP}$) is less than or equal to the blue filter threshold value.

In decision step 1961, if it is determined that the difference between the blue and green pixel sub-component luminous intensity values ($B_{CP} - G_{CP}$) is greater than the blue filter threshold value, operation proceeds to step 1963. In step 1963 the green pixel sub-component luminous intensity value ($G_{CP}$) is increased, and/or the red pixel sub-component luminous intensity value ($R_{CP}$) is decreased and/or the blue pixel sub-component luminous intensity value ($B_{CP}$) is decreased.

Steps 1960, 1962, 1961 and 1963 in combination comprise a blue filter which, in most embodiments, reduces the difference between the blue and green pixel sub-component values when the magnitude of the difference between these values exceeds the blue threshold.

Processing proceeds from step 1963 to return step 1964. Operation proceeds directly from step 1961 to step 1964 if it is determined in step 1961 that the difference between the blue and green pixel sub-component luminous intensity values ($B_{CP} - G_{CP}$) is less than or equal to the blue filter threshold value.

In return step 1964, the values $R_{CP}$, $G_{CP}$ and $B_{CP}$ are output or returned to the routine which called the pixel color processing sub-routine 1952. In this manner, filtered pixel sub-component luminous intensity values are returned.

Some exemplary values for FIG. 9F filter parameters or variables are:

Red Filter Threshold=100;

Red Filter Red Factor=3;

Red Filter Green Factor=2;

Blue Filter Threshold=128;

Blue Filter Red Factor=2;

Blue Filter Green Factor=1; and

Blue Filter Blue Factor=3.

By processing pixel sub-component luminous intensity values using the above described pixel color processing sub-routines, color errors can be reduced or eliminated.

The color filtering operations discussed above, may be combined with the filtering operations performed as part of the scan conversion operation thereby eliminating the need for separate scan conversion and color compensation filters or filtering operations.

In addition, where a limited number of R, G, B luminous intensity value combinations can be generated by the scan conversion operation, the results of performing a color compensation operation can be computed for each possible R, G, B luminous intensity value combination, given a specified foreground and background color. In one such embodiment, the results of the color compensation operation are stored in a look-up table 539 in memory 522. The look-up table is accessed as a function of the R, G, B pixel sub-component luminous intensity values corresponding to a pixel to generate a processed set of values corresponding to the results that are produced by performing the routine 1900.

While various methods and apparatus of the present invention have been described in the context of liquid crystal display devices or in the context of being used with liquid crystal displays, many of the methods and apparatus of the present invention can be used with, and improve, image quality on a number of types of output and display devices.

For example, the scaling, scan conversion and hinting methods discussed above which involve treating different color pixel sub-components as independent luminous intensity sources, may be applied to images which are to be displayed on cathode ray tube (CRT) displays.

Printers represent another class of output devices to which the scaling, hinting and scan conversion operations of the present invention may be applied. The methods and apparatus of the present invention are particularly well suited for use with ink jet and other types of printers where portions of an image are represented by displaced (offset) color samples printed on a fixed medium, e.g., paper.

While liquid crystal (LDC) and other types of display devices often share certain common characteristics, e.g., the use of RGB pixel sub-components to represent a pixel, specific display characteristics, e.g., color filter characteristics, may vary from manufacturer to manufacturer. Display, e.g., monitor, characteristics may also vary between different types of monitors produced by the same manufacturer.

One embodiment of the present invention takes into consideration differences between different monitors by storing anti-aliasing information, e.g., weighting factor information, for specific display devices, in memory. The rasterization and rendering routines of the present invention utilize this display device information when available for the particular display device being used in a given application. Accordingly, in various embodiments of the present invention, anti-aliasing and gamma correction operations are implemented using stored filter weights and gamma values associated with individual models of display devices, e.g., LCD screens.

Anti-aliasing operations are performed in various above described embodiments in one dimension through the use of different red, green and blue weights used during the scan conversion process. The application of anti-aliasing techniques in a second dimension are contemplated, and in various exemplary embodiments are employed to further enhance image quality.

In view of the description of the invention included herein, numerous additional variations on the discussed embodiments of the present invention will be apparent to one of ordinary skill in the art. It is to be understood that such embodiments do not depart from the present invention and are to be considered within the scope of the invention.

What is claimed is:

1. A method of processing image data corresponding to a plurality of pixels for display on a display device, the data corresponding to each pixel including at least a first and a second pixel sub-component luminous intensity value, the method comprising the steps of:

obtaining the first and the second pixel sub-component luminous intensity values of a first pixel;

determining if the first pixel sub-component luminous intensity value of a first pixel falls within a first range of acceptable pixel sub-component luminous intensity values; and if it is determined that the first pixel sub-component luminous intensity value of the first pixel does not fall within said first range of acceptable pixel sub-component luminous intensity values, performing the steps of:

adjusting at least one of the first and second pixel sub-component luminous intensity values of the first pixel by changing the intensity thereof; and displaying an image on the display device using the first and second pixel sub-component luminous intensity values of the first pixel after said at least one of the first and second pixel sub-component luminous intensity values has been adjusted so as to reduce a color artifact that would otherwise be experienced.

2. The method of claim 1, wherein the first range of acceptable pixel sub-component luminous intensity values is a function of a first foreground color pixel sub-component luminous intensity value and a first background color pixel sub-component luminous intensity value.

3. The method of claim 2, wherein the step of adjusting includes changing the first pixel sub-component luminous intensity value of the first pixel to equal the closer one of said first foreground color pixel sub-component luminous intensity value and said first background color pixel sub-component luminous intensity value.

4. The method of claim 1, wherein the first range of acceptable pixel sub-component luminous intensity values extends from, and includes, a first foreground color pixel sub-component luminous intensity value, and a first background color pixel sub-component luminous intensity value.

5. The method of claim 4, wherein the step of adjusting includes changing the first pixel sub-component luminous intensity value of the first pixel to equal one of said first foreground color pixel sub-component luminous intensity value and said first background color pixel sub-component luminous intensity value.

6. The method of claim 4, wherein the step of adjusting includes changing the first pixel sub-component luminous intensity value of the first pixel to equal the closer one of said first foreground color pixel sub-component luminous intensity value and said first background color pixel sub-component luminous intensity value.

7. The, method of claim 1, further comprising the steps of:

determining if the second pixel sub-component luminous intensity value of said first pixel falls within a second range of acceptable pixel sub-component luminous intensity values; and when it is determined that the second pixel sub-component luminous intensity value of said first pixel does not fall within said second range of acceptable pixel sub-component luminous intensity values, adjusting the second pixel sub-component luminous intensity value of the first pixel by changing the intensity thereof.

8. The method of claim 7, wherein the second range of acceptable pixel sub-component luminous intensity values is a function of a second foreground color pixel sub-component luminous intensity value and a second background color pixel sub-component luminous intensity value.

9. The method of claim 8, wherein the step of adjusting the second pixel sub-component luminous intensity value includes changing the second pixel sub-component luminous intensity value of the first pixel to equal the closer one of said second foreground color pixel sub-component luminous intensity value and said second background color pixel sub-component luminous intensity value.

10. The method of claim 7, wherein the second range of acceptable pixel sub-component luminous intensity values extends from, and includes, a second foreground color pixel sub-component luminous intensity value, and a second background color pixel sub-component luminous intensity value; and wherein the step of adjusting the second pixel sub-component luminous intensity value includes changing the second pixel sub-component luminous intensity value of the first pixel to equal one of said second foreground color pixel sub-component luminous intensity value and said second background color pixel sub-component luminous intensity value.

11. The method of claim 10, wherein the first pixel sub-component luminous intensity value of the first pixel is a red pixel sub-component luminous intensity value and the second pixel sub-component luminous intensity value of the first pixel is a green pixel sub-component luminous intensity value.

12. The method of claim 7, wherein the first pixel sub-component luminous intensity value of the first pixel is a red pixel sub-component luminous intensity value and the second pixel sub-component luminous intensity value of the first pixel is a green pixel sub-component luminous intensity value.

13. The method of claim 7, wherein the data corresponding to each pixel further includes a third pixel sub-component luminous intensity value, the method further comprising the steps of:

determining if the third pixel sub-component luminous intensity value of said first pixel falls within a third range of acceptable pixel sub-component luminous intensity values; and when it is determined that the third pixel sub-component luminous intensity value of said first pixel does not fall within said third range of acceptable pixel sub-component luminous intensity values, adjusting the third pixel sub-component luminous intensity value of the first pixel by changing the intensity thereof.

14. The method of claim 13, wherein the third range of acceptable pixel sub-component luminous intensity values extends from, and includes, a third foreground color pixel sub-component luminous intensity value, and a third background color pixel sub-component luminous intensity value; and wherein the step of adjusting the third pixel sub-component luminous intensity value includes changing the third pixel sub-component luminous intensity value of the first pixel to equal one of said second foreground color pixel sub-component luminous intensity value and said second background color pixel sub-component luminous intensity value.

15. The method of claim 13, further comprising the steps of:

determining if a first pixel sub-component luminous intensity value of a second pixel falls within the first range of acceptable pixel sub-component luminous intensity values; and when it is determined that the first pixel sub-component luminous intensity value of the second pixel does not fall within said first range of acceptable pixel sub-component luminous intensity values, adjusting the first pixel sub-component luminous intensity value of the second pixel by changing the intensity thereof.

16. The method of claim 15, further comprising the steps of:
   determining if the second pixel sub-component luminous intensity value of said second pixel falls within the second range of acceptable pixel sub-component luminous intensity values; and
   when it is determined that the second pixel sub-component luminous intensity value of said second pixel does not fall within said second range of acceptable pixel sub-component luminous intensity values, adjusting the second pixel sub-component luminous intensity value of the second pixel by changing the intensity thereof.

17. The method of claim 16, further comprising the steps of:
   determining if the third pixel sub-component luminous intensity value of said second pixel falls within the second range of acceptable pixel sub-component luminous intensity values; and
   when it is determined that the third pixel sub-component luminous intensity value of said second pixel does not fall within said third range of acceptable pixel sub-component luminous intensity values, adjusting the third pixel sub-component luminous intensity value of the second pixel by changing the intensity thereof.

18. The method of claim 15,
   wherein the step of adjusting the first pixel sub-component luminous intensity value of the second pixel includes changing the first pixel sub-component luminous intensity value of the second pixel to equal one of said first foreground color pixel sub-component luminous intensity value and said first background color pixel sub-component luminous intensity value.

19. The method of claim 18, wherein said display device is a liquid crystal display device, wherein the step of displaying the image on the display device comprises the step of using the first, second and third pixel sub-component luminous intensity values of said first and second pixels to control the output of first and second pixels of said display device.

20. A computer readable medium, comprising:
   computer executable instructions for performing a pixel processing operation, the pixel processing operation including the steps of:
      obtaining a first pixel sub-component luminous intensity value of a pixel;
      determining if a the first pixel sub-component luminous intensity value of the pixel falls within a range of acceptable pixel sub-component luminous. intensity values; and
      if it is determined that the first pixel sub-component luminous intensity value does not fall within said range of acceptable pixel sub-component luminous intensity values, performing the steps of:
         adjusting the first pixel sub-component luminous intensity value by changing the intensity thereof; and
         displaying an image on the display device using the first pixel sub-component luminous intensity value after the step of adjusting so as to reduce a color artifact that would otherwise be experienced.

21. The computer readable medium of claim 20, wherein the step of adjusting includes changing the first pixel sub-component luminous intensity value to equal the closer one of a foreground color pixel sub-component luminous intensity value and a background color pixel sub-component luminous intensity value.

22. The computer readable medium of claim 21, wherein the pixel sub-component luminous intensity value is a green pixel sub-component luminous intensity value, the foreground color pixel sub-component luminous intensity value and the background color pixel sub-component luminous intensity values both correspond to green pixel sub-components.

23. A display system, comprising:
   a display device including a plurality of pixels, each pixel including a plurality of pixel sub-components;
   means for generating pixel sub-component luminous intensity values from filtered displaced image samples, each pixel sub-component luminous intensity value corresponding to a different portion of an image;
   means for comparing each pixel sub-component luminous intensity value to a range of acceptable pixel sub-component luminous intensity values; and
   means for adjusting a pixel sub-component luminous intensity value by changing the intensity thereof if it is determined by the means for comparing to be outside the range of acceptable pixel sub-component luminous intensity values to which the pixel sub-component luminous intensity value is compared.

24. The display system of claim 23, wherein the means for modifying a pixel sub-component luminous intensity value includes means for changing the pixel sub-component being modified to the closer of a first pixel sub-component luminous intensity value and a second pixel sub-component luminous intensity value which are end points to the range of acceptable pixel sub-component luminous intensity values to which the pixel sub-component luminous intensity value being modified was compared.

25. The display system of claim 24, wherein said display device is a liquid crystal display and wherein each pixel includes a red, a green and a blue pixel sub-component.

26. The display system of claim 25, wherein said end points of the range are foreground and background pixel sub-component luminous intensity values.

27. A method of processing pixels representing an image being displayed using a foreground and a background color, the method comprising the steps of:
   receiving current pixel red, green, and blue luminous intensity values corresponding to a pixel being processed;
   determining if the current pixel red luminous intensity value is within a range of acceptable red luminous intensity values; and
   if it is determined that the current pixel red luminous intensity value is outside the range of acceptable red luminous intensity values, performing the steps of:
      adjusting the current pixel red luminous intensity value to a value within the range of acceptable red luminous intensity values by adjusting the intensity thereof; and
      displaying an image on a display device using the adjusted current pixel red luminous intensity value so as to reduce a color artifact that would otherwise be experienced.

28. The method of claim 27,
   wherein the foreground color is determined by a red foreground luminous intensity value, a green foreground luminous intensity value and a blue foreground luminous intensity value;

wherein the background color is determined by a red background luminous intensity value, a green background luminous intensity value and a blue background luminous intensity value; and wherein the range of acceptable red luminous intensity values extends between and includes the red foreground luminous intensity value and the red background luminous intensity value.

29. The method of claim 28, wherein the step of adjusting the current pixel red luminous intensity value to a value within the range of acceptable red luminous intensity values includes the step of:

changing the current pixel red luminous intensity value to the closer one of the foreground and background red luminous intensity values.

30. The method of claim 29, further comprising the steps of:

determining if the current pixel green luminous intensity value is within a range of acceptable green luminous intensity values; and if it is determined that the current pixel green luminous intensity value is outside the range of acceptable green luminous intensity values, adjusting the current pixel green luminous intensity value to a value within the range of acceptable green luminous intensity values by changing the intensity thereof.

31. The method of claim 30, wherein the range of acceptable green luminous intensity values extends between and includes the green foreground luminous intensity value and the green background luminous intensity value.

32. The method of claim 31, wherein the step of changing the current pixel green luminous intensity value to a value within the range of acceptable green luminous intensity values includes the step of:

changing the current pixel green luminous intensity value to the closer one of the foreground and background green luminous intensity values.

33. The method of claim 32, further comprising the steps of:

determining if the current pixel blue luminous intensity value is within a range of acceptable blue luminous intensity values; and if it is determined that the current pixel blue luminous intensity value is outside the range of acceptable blue luminous intensity values, adjusting the current pixel blue luminous intensity value to a value within the range of acceptable blue luminous intensity values by changing the intensity thereof.

34. The method of claim 33, wherein the range of acceptable luminous intensity values extends between and includes the blue foreground luminous intensity value and the blue background luminous intensity value.

35. The method of claim 34, wherein the step of changing the current pixel blue luminous intensity value to a value within the range of acceptable blue luminous intensity values includes the step of:

changing the current pixel blue luminous intensity value to the closer one of the foreground and background blue luminous intensity values.

36. The method of claim 35, wherein the foreground color is specified by a red foreground luminous intensity value, a green foreground luminous intensity value and a blue foreground luminous intensity value;

wherein the background color is specified by a red background luminous intensity value, a green background luminous intensity value and a blue background luminous intensity value; and wherein the step of adjusting the current pixel red luminous intensity value to a value within the range of acceptable red luminous intensity values includes the step of:

changing the current pixel red luminous intensity value to the closer one of the foreground and background red luminous intensity values.

37. The method of claim 36, further comprising the step of:

determining if the current pixel green luminous intensity value is within a range of acceptable green luminous intensity values; and if it is determined that the current pixel green luminous intensity value is outside the range of acceptable green luminous intensity values, adjusting the current pixel green luminous intensity value to the closer one of the foreground and background green luminous intensity values.

38. The method of claim 36, further comprising the step of:

determining if the current pixel blue luminous intensity value is within a second range of acceptable blue luminous intensity values; and if it is determined that the current pixel blue luminous intensity value is outside the second range of acceptable blue luminous intensity values, adjusting the current pixel blue luminous intensity value to the closer one of the foreground and background blue luminous intensity values.

39. A computer readable medium, comprising:

computer executable instructions for performing a pixel processing operation, the pixel processing operation including the steps of:

receiving current pixel red, green, and blue luminous intensity values corresponding to a pixel being processed;

determining if the current pixel red luminous intensity value is within a range of acceptable red luminous intensity values;

if it is determined that the current pixel red luminous intensity value is outside the range of acceptable red luminous intensity values, performing the steps of:

adjusting the current pixel red luminous intensity value to a value within the range of acceptable red luminous intensity values by adjusting the intensity thereof; and displaying an image on a display device using the adjusted current pixel red luminous intensity value so as to reduce a color artifact that would otherwise be experienced.

40. A method of processing red, green and blue pixel sub-component luminous intensity values, comprising the steps of:

receiving current pixel red and green luminous intensity values corresponding to a pixel being processed;

determining if the magnitude of the difference between the red and green pixel sub-component luminous intensity values exceeds a red filter threshold value; and if the magnitude of the difference between the red and green pixel sub-component luminous intensity values exceeds the red filter threshold value, performing the steps of:

modifying the intensity of at least one of the red and green pixel sub-component luminous intensity values to decrease the magnitude of the difference therebetween; and displaying an image on a display device using said at least one of the red and green luminous intensity values after the step of modifying the intensity so as to reduce a color artifact that would otherwise be experienced.

41. The method of claim 40, further comprising the subsequent steps of:

determining if the magnitude of the difference between the green pixel sub-component luminous intensity value and a blue pixel sub-component luminous intensity values exceeds a blue filter threshold value; and if the magnitude of the difference between the green and blue pixel sub-component luminous intensity values exceeds the blue filter threshold, modifying the intensity of at least one of the blue and green pixel sub-component luminous intensity values to decrease the magnitude of the difference therebetween.

42. A method of processing red, green and blue pixel sub-component luminous intensity values, comprising the steps of:

receiving current pixel red and green luminous intensity values corresponding to a pixel being processed;

determining if a red difference value resulting from subtracting the green pixel sub-component luminous intensity values from the red pixel sub-component luminous intensity value exceeds a red filter threshold value; and if said red difference value exceeds the red filter threshold value, modifying the intensity of at least one of the red and green pixel sub-component luminous intensity values to decrease the magnitude of the difference therebetween; and displaying an image on the display device using said at least one of the red and green luminous intensity values after the step of modifying the intensity so as to reduce a color artifact that would otherwise be experienced.

43. The method of claim 42, further comprising the subsequent steps of:

determining if a blue difference value resulting from subtracting the blue pixel sub-component luminous intensity value from the green pixel sub-component luminous intensity value exceeds a blue filter threshold value; and if the blue difference value exceeds the blue filter threshold, modifying the intensity of at least one of the blue and green pixel sub-component luminous intensity values to decrease the magnitude of the difference therebetween.

44. The method of claim 43, further comprising the subsequent steps of:

determining if a blue difference value resulting from subtracting the blue pixel sub-component luminous intensity value from the green pixel sub-component luminous intensity value exceeds a blue filter threshold value; and if the blue difference value exceeds the blue filter threshold, increasing the intensity of the red pixel sub-component luminous intensity value.

* * * * *

UNITED STATES PATENT AND TRADEMARK OFFICE
CERTIFICATE OF CORRECTION

PATENT NO.    : 6,396,505 B1
DATED         : May 28, 2002
INVENTOR(S)   : Charlton E. Lui et al.

It is certified that error appears in the above-identified patent and that said Letters Patent is hereby corrected as shown below:

<u>Column 11,</u>
Line 1, after "in FIG. 3, it is" insert -- a --
Line 36, after "information 815" insert -- . --
Line 40, after "information 815" replace "maybe" with -- may be --

Signed and Sealed this

Eleventh Day of March, 2003

JAMES E. ROGAN
*Director of the United States Patent and Trademark Office*